US011775539B2

(12) United States Patent
Young

(10) Patent No.: US 11,775,539 B2
(45) Date of Patent: *Oct. 3, 2023

(54) SYSTEMS AND METHODS FOR PROVIDING A REVIEW PLATFORM

(71) Applicant: Warren Young, Northbrook, IL (US)

(72) Inventor: Warren Young, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,754

(22) Filed: Jul. 12, 2022

(65) Prior Publication Data

US 2022/0342893 A1   Oct. 27, 2022

Related U.S. Application Data

(63) Continuation of application No. 16/931,797, filed on Jul. 17, 2020, now Pat. No. 11,386,097, which is a continuation of application No. 14/202,657, filed on Mar. 10, 2014, now Pat. No. 10,733,194.

(60) Provisional application No. 61/775,471, filed on Mar. 8, 2013.

(51) Int. Cl.
*G06F 17/00* (2019.01)
*G06F 7/00* (2006.01)
*G06F 16/2457* (2019.01)
*G06F 16/95* (2019.01)
*G06F 16/9535* (2019.01)

(52) U.S. Cl.
CPC ........ *G06F 16/24578* (2019.01); *G06F 16/95* (2019.01); *G06F 16/9535* (2019.01)

(58) Field of Classification Search
CPC . G06F 16/24578; G06F 16/95; G06F 16/9535

USPC .......................................................... 707/748
See application file for complete search history.

(56) References Cited

U.S. PATENT DOCUMENTS

| 7,711,684 B2* | 5/2010 | Sundaresan | H04L 51/046 |
| | | | 705/52 |
| 8,190,732 B1* | 5/2012 | Cooley | G06Q 30/08 |
| | | | 709/224 |
| 8,660,864 B2* | 2/2014 | Krause | H04L 51/52 |
| | | | 705/4 |
| 2007/0226374 A1* | 9/2007 | Quarterman | G06Q 30/02 |
| | | | 709/250 |
| 2008/0015925 A1* | 1/2008 | Sundaresan | G06Q 30/01 |
| | | | 705/7.11 |
| 2008/0162265 A1* | 7/2008 | Sundaresan | H04L 67/01 |
| | | | 707/781 |
| 2009/0271450 A1* | 10/2009 | Bush | G06F 40/197 |
| | | | 707/999.203 |

(Continued)

*Primary Examiner* — Pavan Mamillapalli
(74) *Attorney, Agent, or Firm* — K&L Gates LLP

(57) ABSTRACT

A method for personalizing reviews for a user on a social network, comprising the steps of: receiving from at least two or more users a rating and a recommendation for a reviewable item, wherein the rating is numerical value in a rating scale, and wherein a recommendation is a binary endorsement; receiving a request from a user to view the ratings and recommendations for one or more reviewable items; determining a combined rating and an combined recommendation for all users of the social network at one or more social degrees for the one or more reviewable items; and displaying, by a user interface, the combined rating and combined recommendation for all users of the social network at one or more social degrees for the one or more reviewable items.

20 Claims, 13 Drawing Sheets

(56) References Cited

U.S. PATENT DOCUMENTS

| | | | |
|---|---|---|---|
| 2009/0319351 A1* | 12/2009 | Soza | G06Q 30/00 |
| | | | 705/14.66 |
| 2010/0211514 A1* | 8/2010 | Sundaresan | G06Q 30/02 |
| | | | 709/204 |
| 2013/0041837 A1* | 2/2013 | Dempski | G06Q 30/0201 |
| | | | 705/345 |
| 2014/0136992 A1* | 5/2014 | Magcale | G06F 16/9535 |
| | | | 715/753 |
| 2014/0156556 A1* | 6/2014 | Lavian | G06Q 30/0282 |
| | | | 705/347 |
| 2022/0075833 A1* | 3/2022 | Marikar | G06F 16/953 |
| 2022/0076145 A1* | 3/2022 | Yalla | G06N 20/00 |
| 2022/0078520 A1* | 3/2022 | Myoung | H04N 21/242 |

* cited by examiner

FIG. 4

View  History  Bookmarks  Tools  Help

Socially | Home

Rating Legend

| Range | Description |
|---|---|
| 18-20 | Exquisite |
| 15-17 | Very Good |
| 12-14 | Good |
| 9-11 | Okay |
| 6-8 | Not Okay |
| 3-5 | Not Good |
| 1-2 | Really Not Good |

Tonelli's Restaurant
Italian, American
1038 Washington Ave. ⟵ 345
Northbrook, Illinois 60062
(847) 277-4370

[Return to Search Results] — 355

[I Want to Go There!] — 350
[Write Review] — 142

Overview — 371

| | # Reviews | % Recommended |
|---|---|---|
| Friends: — 377 | 2 | 100% |
| Friends + 1: — 378 | 1 | 100% |
| Who I'm Following: — 379 | 6 | 100% |
| All: — 380 | 9 | 88.9% |

— 372

Reviews — 366

| Reviewer | | Recommended? — 361 | Food — 362 | Ambiance — 363 | Service — 364 | Cost — 365 | Reviewed |
|---|---|---|---|---|---|---|---|
| You | Great pizza! [Edit]—367 | Y | 14 | 12 | 12 | $12 | 02/12/2013 |
| Sarah Peterson | Good pizza and Italian. | Y | 13 | 12 | 12 | $13 | 02/12/2013 |
| Cameron Fischer | Tasty pizza! | Y | 13 | 12 | 12 | $12 | 02/12/2013 |
| Warren Y. | | Y | 15 | 13 | 13 | $12 | 02/12/2013 |
| Brian J. | | Y | 14 | 14 | 14 | $10 | 02/12/2013 |

373 — Food  374 — Ambiance  375 — Service  376 — Cost

![Browser window mockup - 400]

View  History  Bookmarks  Tools  Help
Socially | Home | +

Robert Smith

Rating Legend
| Range | Description |
|---|---|
| 18-20 | Exquisite |
| 15-17 | Very Good |
| 12-14 | Good |
| 9-11 | Okay |
| 6-8 | Not Okay |
| 3-5 | Not Good |
| 1-2 | Really Not Good |

Restaurant List

City: Northbrook, Illinois — 409
List Name: My favorite restaurants in Northbrook — 410
Cuisine: [▼] — 420
Dining Type: [▼] — 430
Description: My favorite restaurants in Northbrook — 440

[Update Header]

Restaurants in List

| | Restaurant | Address | Recommend 361 | Food 362 | Ambiance 363 | Service 364 | Cost 365 |
|---|---|---|---|---|---|---|---|
| ○ | Tonelli's Restaurant ← 405 | 1038 Washington Ave. Northbrook, IL 60062 (847) 277-4370 | Y | 14 | 12 | 12 | $12 |
| | Great pizza! ← 366 | | | | | | |
| ○ | Joe's Ribs ← 360 | 200 Washington Ave. Northbrook, IL 60062 (847) 277-4000 | Y | 16 | 16 | 16 | $25 |
| | Fantastic ribs! | | | | | | |
| ○ | Francesca's Cafe | 1145 Main St. Northbrook, IL 60062 (847) 277-2600 | Y | 16 | 15 | 15 | $10 |
| | My favorite Italian in Northbrook! | | | | | | |

Remove Selected from List: [Remove]

Add a Restaurant to List: [        ] [Add]

FIG. 8

View  History  Bookmarks  Tools  Help

Socially | Home | +

Rating Legend

| Range | Description |
|---|---|
| 18-20 | Exquisite |
| 15-17 | Very Good |
| 12-14 | Good |
| 9-11 | Okay |
| 6-8 | Not Okay |
| 3-5 | Not Good |
| 1-2 | Really Not Good |

345

You searched for 'Italian' restaurants, reviewed by Friends, with Food, Service, and Ambiance greater than 11.
3 restaurants met your search criteria. Displaying restaurants 1 - 3.

Advanced Search Results

| Restaurant | | Reviews | Recommend | Food | Ambiance | Service | Cost |
|---|---|---|---|---|---|---|---|
| | | 371 | 372 | 373 | 374 | 375 | 376 |
| Tonelli's Restaurant<br>Italian, American<br>1038 Washington Ave.<br>Northbrook, IL 60062<br>(847) 277-4370 | 377—Friends:<br>378—Friends + 1:<br>379—Who I'm Following:<br>380—All: | 2<br>1<br>6<br>9 | 100%<br>100%<br>100%<br>88.9% | 13<br>13<br>13<br>16 | 12<br>12<br>12<br>15 | 12<br>12<br>12<br>15 | $13<br>$12<br>$12<br>$19 |
| Francesca's Cafe<br>Italian, Pizza<br>1145 Main St.<br>Northbrook, IL 60062<br>(847) 277-2600 | Friends:<br>Friends + 1:<br>Who I'm Following:<br>All: | 2<br>1<br>6<br>9 | 100%<br>100%<br>100%<br>87.5% | 16<br>16<br>15<br>14 | 15<br>15<br>14<br>14 | 15<br>15<br>13<br>12 | $19<br>$19<br>$19<br>$13 |
| Barney's of Northbrook<br>Pizza, American, Italian<br>600 Main Ave.<br>Northbrook, IL 60062<br>(847) 555-1200 | Friends:<br>Friends + 1:<br>Who I'm Following:<br>All: | 2<br>1<br>6<br>9 | 100%<br>100%<br>100%<br>87.5% | 13<br>13<br>13 | 12<br>12 | 12<br>11 | $12<br>$12 |

Return  562

Save This Search

Name: ____  564  Save 470  560

FIG. 9

Chicago, IL

Unique to you
| Name | Ratings | | | |
|---|---|---|---|---|
| Macku Sushi | Y 15 | 16 | 15 | 20 |
| Province | Y 17 | 16 | 15 | 28 |

361  363  365
362  364

610

Common to Both
| Name | Ratings | | | | |
|---|---|---|---|---|---|
| Francesca Cafe | | | | | |
| You | Y 16 | 15 | 15 | 18 | |
| Friend | Y 15 | 14 | 14 | 20 | |

361  363  365
362  364

620

Unique to Friend
| Name | Ratings | | | |
|---|---|---|---|---|
| Farmhouse | Y 17 | 15 | 15 | 20 |
| G Bistro | Y 15 | 15 | 14 | 25 |

361  363  365
362  364

630

Unique to you
| Name | Ratings | | | |
|---|---|---|---|---|
| Macku Sushi | Y 15 | 16 | 15 | 20 |
| Province | Y 17 | 16 | 15 | 28 |

361  363  365
362  364

610

Common to All
| Name | Ratings | | | | |
|---|---|---|---|---|---|
| Francesca Cafe | | | | | |
| You | Y 16 | 15 | 15 | 18 | |
| All Friends | Y 15 | 15 | 14 | 19 | |

362  364
361  363  365
372  374  376
373  375

640

Unique to All Friends
| Name | Ratings | | | |
|---|---|---|---|---|
| Farmhouse | Y 17 | 15 | 15 | 20 |
| G Bistro | Y 15 | 15 | 15 | 25 |
| Balena | Y 14 | 16 | 15 | 18 |
| Storefront Co | Y 14 | 15 | 15 | 22 |
| Au Cheval | Y 13 | 13 | 13 | 16 |

Socially | Home

582 — New York, NY
Travel Review
584 — Type: New York, NY
586 — Traveling: Pleasure
588 — Dates: With Significant Other
Sept 2009

360 —

| Type | Place | 361 Recommend | 368 Rating | | | |
|---|---|---|---|---|---|---|
| Hotel | Westin Times Sq | Y | 8 | | | |
| | | | | 362 Food | 363 Ambiance | 364 Service | 365 Cost |
| Type | Place | 361 Recommend | | 15 | 15 | 15 | $ 30 |
| Restaurant | Bar Americain | Y | | | | | |

360 —

| Type | Place | 361 Recommend | 368 Rating |
|---|---|---|---|
| Nat'l Park | Statue of Liberty | Y | 9 |
| City Park | Central Park | Y | 10 |
| Museum | Met. Mus. of Art | Y | 7 |
| Attraction | Open Air Bus Tour | Y | 8 |
| Attraction | Top of the Rock | Y | 8 |

592 — Recommend: Yes
594 — Rating: 9
596 — Comments: Fun time!

View  History  Bookmarks  Tools  Help

Socially | Home | +

Northbrook, IL

Restaurant Lists

Most Popular — 760
1. Tonelli's Restaurant
2. Francesca's Cafe
3. Barney's of Northbrook

Highest Recommended — 761
1. Tonelli's Restaurant (88.9%)
2. Francesca's Cafe (87.5%)
3. Barney's of Northbrook (87.5%)

Top Food — 762
1. Francesca's Cafe
2. Tonelli's Restaurant
3. Barney's of Northbrook

Top Ambiance — 763
1. Tonelli's Restaurant
2. Francesca's Cafe
3. Barney's of Northbrook

Top Service — 764
1. Tonelli's Restaurant
2. Francesca's Cafe
3. Barney's of Northbrook

Top by Cuisine — 765
1. Tonelli's Restaurant
2. Francesca's Cafe
3. Barney's of Northbrook

Trending — 766
1. Tonelli's Restaurant
2. Francesca's Cafe
3. Barney's of Northbrook

Hotel Lists

Most Popular — 760
1. Northbrook Inn
2. Taylor's B&B
3. The Grand

Highest Recommended — 761
1. Northbrook Inn
2. Taylor's B&B
3. The Grand

Top Quality — 767
1. Northbrook Inn
2. Taylor's B&B
3. The Grand

Top Service — 764
1. Northbrook Inn
2. Taylor's B&B
3. The Grand

Trending — 766
1. Northbrook Inn
2. Taylor's B&B
3. The Grand

SYSTEMS AND METHODS FOR PROVIDING A REVIEW PLATFORM

CROSS-REFERENCE TO RELATED APPLICATIONS

This application comprises a continuation application claiming priority to U.S. application Ser. No. 16/931,797 filed Jul. 17, 2020, which is a continuation application of U.S. application Ser. No. 14/202,657 filed Mar. 10, 2014, which claims the benefit of priority to U.S. Provisional Patent Application No. 61/775,471 filed Mar. 8, 2013, the entireties of which are incorporated herein by reference.

BACKGROUND OF THE INVENTION

The present subject matter relates generally to a computer system that enables people to create content, and to search for content they create and content created by other people who use the system. More specifically, the present invention relates to a computer system—a social review system—that (1) enables people to form relationships with other people who use the system; (2) enables people to create content about a variety of goods, services, activities, and events—ratings and reviews of goods, services, activities and events, lists of goods, services, activities and events, and other similar content; (3) provides functionality to generate new data about the content created based on social relationships people who use the system establish; (4) provides tools and functionality for people to search for content they create and content created by other people who use the system, and to leverage social relationships of varying social distances people have established in the system when searching—through the use of filters and other processes; (5) provides tools and functionality for people to manipulate content created in an effort to create new content.

There is an issue of trust on review sites on the Internet today. People can't always trust the reviews and ratings they read. People don't know who the reviewers are. People don't know if the review is real or fake. People don't know the bias or motivation behind the review.

There is an issue of data overload on review sites on the Internet today. With so much information out on the Internet, it is becoming increasingly more difficult to process all of this data. People are overwhelmed.

There is an issue of being able to know what activities one's friends have done using websites on the Internet today. Websites don't provide the functionality and processes for a person to easily figure out their friends' activities: where their friends have been, what they've seen, what they've done. For instance, to which restaurants have a person's friends gone? To which do they want to go? To which movies have a person's friends seen? To which to they want to see? To where have a person's friends traveled? What did they do?

Similarly, there is an issue of being able to know what opinions one's friends have about things, such as activities they have done, services they have received, goods they have purchased, and events they have attended using sites on the Internet today. People want to know their friends' opinions about things. For a given restaurant, movie, music album, etc., what did their friends think? How did they review it? What was the overall opinion about a restaurant, movie, music album, etc. by all of a person's friends?

Continuing, there is an issue of being able to compare one's reviews of things with the reviews of one of their friends on review sites on the Internet today. People are unable to compare their reviews with the reviews of a friend. For instance, what music albums has a person reviewed, what music albums has their friend reviewed, and what is unique to the person, unique to the friend, and common to both? Further, this comparison cannot be performed for all of a person's friends in aggregate, either.

There is an issue of disparate review sites for different activities, products, and services on the Internet today. There isn't a central place to find reviews about activities, products, and services, specifically "lifestyle" activities, services, and products: restaurants, movies, music, travel, smartphone apps, books, etc. Today, people have to use multiple sites to review and find reviews about lifestyle activities.

There is an issue with the information captured about reviews on review sites on the Internet today. The composition of most reviews on the Internet fall into one of the following categories: (1) A recommendation [yes/no], and comments (optional); (2) A rating (some score on a scale of 1-5 or 1-10), and comments (optional); (3) Comments only. Additionally, many review sites offer a rating scale that is 1-5 where "3" is "OK". This is limiting. That leaves 2 ratings for "better than OK", which makes differentiating things that are "better than OK" difficult.

There is an issue of being able to search for lists of things on the Internet today. Lists on the Internet today have very little data associated with them to differentiate one from another, and that makes searching for relevant lists challenging. Lists today have a name—"My favorite Chicago restaurants", or "My favorite Beatles albums"- and may be made for a particular category—restaurants, movies, music, etc. Searching through lists is challenging because one can only filter on the name of the list, and possibly the category of the list, if that exists.

There is an issue with travel reviews on review sites on the Internet today. Current travel reviews on the Internet are limited by the domain of categories and domain of places and activities a person may review. That is, sites on the Internet offer a limited number of categories for travel reviews, such as hotels, restaurants, points-of-interest, and the domain of entities within each category is also limited. Further, those reviews are discrete. The reviews exist as standalone reviews. Reviews today are not brought together or related in a way to know what a person did on their trip to a destination.

There is an issue of disparate event sites showing calendars of events on the Internet today. There isn't a central place to know what events are occurring in a particular location (city, state, geographic region) during a certain time frame: What's happening in Chicago this weekend? What food festivals are happening in Georgia in the next 3 months? What beer and wine festivals are happening in Washington and Oregon in July and August? What film festivals are happening in the United States this year? Today, people have to use multiple sites to find events that are happening. Today, a person would have to use multiple sites, one for each type of activity, and possibly one for each type of activity at a particular location, to ascertain what events were happening in a particular location at a certain time.

There is an issue of knowing what is along one's route when traveling using the Internet today. A person can search for places and activities of interest for a specific location, but there isn't an easy way for a person to find places and activities of interest for multiple locations along a route without performing multiple searches. When a person is going from Point A to Point B, what is along the way that they might find interesting or worthwhile, be it parks (city, state, national), museums, restaurants, hotels, gardens, shopping districts/malls, etc.?

There is an issue of knowing which of a person's friends are nearby using the Internet today. There isn't a single site where a person can search to find which of their friends are nearby.

There is an issue of enabling advertisers to bid on displaying their advertisements to people through an auction process based on people's profiles today. There isn't an auction site that allows advertisers to bid on showing their advertisements to people based on people's profiles. Today, advertisers are able to bid on keywords a person may type, such as "hotels in New York City" or "cold medicine", in order to display their advertisements, but there isn't a way for advertisers to bid to display their advertisements to people who meet their target profile, and that profile may be based on such factors as age, gender, location, and activity history.

BRIEF SUMMARY OF THE INVENTION

To meet the needs described above and others, an invention was created that is a computer system that is a review application, a decision support system, and a social discovery tool. The invention may be called a social review system. People who use the social review system are called users.

The social review system allows users to write reviews of their experiences, such as review a restaurant at which they dined, review a music album to which they listened, or review a movie which they saw. The social review system allows users to search through these reviews to help them make decisions in their life (where to go, what to do, what to buy) and discover new experiences (where to go, what to do, what to buy). This is achieved by providing users with tools and functionality to make better use of those reviews, especially reviews by users they know and trust, so they can make more informed decisions, and discover new experiences.

New processes were invented to calculate data, filter data, and prioritize, arrange, and display data, especially from sources users trust, to provide users with more relevant data so they can make more informed decisions, and discover new experiences. The social review system allows users to review experiences across a variety of categories, such as, but not limited to, restaurants, music, movies, smartphone apps, travel destinations, things to do, places to see, etc. The social review system has the flexibility to be expanded to other categories such as other food service providers, books, electronics, products, other service providers, sporting events to watch, sporting events in which to participate, and things like charities. The social review system is made available through a website on the Internet (aka the World Wide Web).

The social review system allows users to write reviews. Reviews may have 3 components: Recommend, Rating, and Comments. The Recommendation component may be a Yes/No indicating whether or not the person recommends the entity being reviewed. The Rating component may be a numerical value the person assigns based on their opinion of the quality of attribute being rated, e.g. movie rating—a person would assign a numerical value based on their opinion of the quality of the movie. Food rating—a person would assign a numerical value based on their opinion of the quality of the food at a restaurant. Depending on the category being reviewed—restaurants, movies, hotels—will determine which and how many attributes will be rated.

Some categories, like movies and music, may have a single rating to rate the overall quality of the entity. Other categories, like restaurants and hotels, may have ratings for multiple attributes of the entity: food rating, service rating, and ambiance rating for restaurants; room rating, service rating, and location rating for hotels. The Comment component may be a text field where a user can write their opinion about their experience. The Comment component may be an optional field to complete.

There is a social component to the system. Users may be able to establish "friendships" and "following relationships" with other users (see the Glossary section herein for more information). These relationships may be applied when users search for, and view, records in the system, such as searching for and viewing restaurants, music, or movies.

These relationships may be incorporated into the processes that calculate data, filter data, and prioritize, arrange, and display data. For instance, median ratings for an entity may be calculated for the following subsets of users: Friends', Friends' +1, "Who I'm Following", and everyone. Median ratings may be calculated by aggregating the ratings by the subset of users for a particular entity and calculating the median rating that was assigned by that subset of users. For instance, the Friends' rating of a movie would be the median rating a user's friends assigned to a particular movie. Additionally, functionality may exist to allow a user to filter reviews for a restaurant to only include reviews written by the user's friends.

Friends are users of the system who have established a "friendship" with the user. Friends +1 are users of the system who are friends with the user's friends, but not friends with the user. Friends +1 share a mutual "friend" with the user. "Who I'm Following" are users of the system the user has indicated they want to follow. Everyone is everyone who uses the system.

Individual ratings and reviews may be prioritized, arranged, and displayed in such a way to give priority to people the user knows and trusts, such as: User's first, then user's friends, then user's friends +1, then people user is "following", then everyone else. That is, if the user has written a review for the entity (restaurant, movie, music album, etc.), that review appears first. All reviews written by the user's friends appear next. All reviews written by "friends of friends" of the user appear next. All reviews written by people the user is following appear next. All other reviews follow.

The social review system may include search processing to filter data based on ratings and reviews written by people in a user's social network.

For example, when performing an "advanced search", results may be filtered for the following subsets of users: Reviewed by Friends, Recommended by Friends, on Friends' Wishlist, Reviewed by people user is following, Recommended by people user is following, Reviewed by Me, My Wishlist.

Reviewed by Friends filter returns entities (restaurant, movie, music album, etc.) reviewed by the user's friends. Recommended by Friends filter returns entities (restaurant, movie, music album, etc.) reviewed and recommended by the user's friends. Friends Wishlist filter returns entities (restaurant, movie, music album, etc.) on the user's friends' wishlists. Reviewed by Who I'm Following filter returns entities (restaurant, movie, music album, etc.) reviewed by people the user is following. Recommended by Who I'm Following filter returns restaurants reviewed and recommended by people the user is following. Reviewed by Me filter returns entities (restaurant, movie, music album, etc.)

reviewed by the user. My Wishlist filter returns entities (restaurant, movie, music album, etc.) on the user's wishlist.

The social review system may enable reviews in a category to be compared between users. For example, a user may compare their reviews for a category of data with that of a friend's (compare my music reviews with my friend's music reviews). The compare function will display three sets of data: records unique to the user, records unique to the friend, and records common to both. Additionally, a user may compare their reviews for a category of data with the reviews of all of their friends in aggregate (compare my movie reviews with my all of my friends' movie reviews). The compare function will display three sets of data: records unique to the user, records unique to the user's friends, and records common to both.

The social review system may allow users to group reviews together to form "lists". A list may be created for any data category in the system (e.g. restaurants, movies, music, etc.). Along with selecting a data category (e.g. restaurants, movies, music, etc.) and providing a name for the list, users may optionally tag their list with additional data to make the list more meaningful. For instance, restaurant lists may be tagged with the type of meal—breakfast, lunch, dinner, or cheap eats, romantic, special occasion, etc.—or the type of cuisine—American, Italian, steak, sushi, etc. A movie list may be tagged with a timeframe—a specific year, a specific decade, all time—or a genre—action, adventure, comedy, drama, etc.—or a person—Steven Spielberg, Woody Allen, Steve Martin, etc. Each data category (e.g. restaurants, movies, music, etc.) would have their own unique types of tags that can be applied to lists (e.g. restaurants: meal type, cuisine type; movies: timeframe, genre, person; etc.).

The social review system may allow users to search for lists, including searching for lists with particular tags, as well as lists based on social relationships. For instance, the social review system may enable a user to: search for restaurant lists for Chicago, Ill. for breakfast; search for restaurant lists for Los Angeles, Calif. for romantic dinners; search for movie lists for 2009; search for movie lists for comedies written by people I'm following; search for music lists for U2; search for music lists for Jazz written by my friends.

The social review system may allow users to create a "travel list"—a "trip"—that encompasses what they saw and did at their destination. Travel processing may allow users to string together their reviews of the Places they stayed, ate, shopped, visited, etc. to create a "travel list"—a "trip". Users may review any place they wish to include, and this processing allows users to specify and review what they did on their trip.

Users may be able to perform a number of travel related searches. For example, the user may: search for trips to New York City. Where did people stay? Where did they eat? Where did they shop? What did they do?

The social review system may provide functionality to capture, store, and display a calendar of events, as well as functionality to filter and search for events relevant and important to users. The social review system may maintain a calendar of events. System administrators may maintain a list of popular/well-known events (e.g. film festivals like Sundance and South by Southwest, music festivals like Lollapalooza and Coachella, etc.), and functionality may exist to allow users to upload their own events. Filters and processes may allow users to specify a location, a time frame, and types of events so users can find events that are relevant and interesting to them (e.g. all events in Chicago this weekend; all events in Colorado in July and August; food festivals in Washington and Oregon in the next three months; film festivals in the country in the next year).

The social review system may include "What's on my Route" functionality to allow a user to find Places along a route they are traveling. A user may specify a starting location and an ending location, and then specify the type of Place for which they are looking (restaurants, hotels, shopping districts/malls, city/state/national parks, etc.), and the system will return Places that meet their criteria that are on that route (e.g. find hotels between Madison, Wis., and Minneapolis, Minn.; find national parks between Salt Lake City, Utah, and St. George, Utah).

The social review system may include "Who Is Nearby" functionality to allow users to see which of their friends are nearby their current location. Users may activate the "Who Is Nearby" functionality, and the system may retrieve their friends who are near their current location.

The social review system may provide functionality for advertisers to create advertising campaigns, and an auction process for advertisers to bid on users who they want to see their advertisements based on users' profiles. Instead of advertisers bidding on search terms/keywords (e.g. when a user keys in a keyword such as "downhill skiing", "auto dealerships", "cold medicine", etc.), advertisers would bid on user profiles, where a user profile may be comprised of the following attributes: Age, Gender, Home Zip Code, Current Location, Review History. These attributes could be expanded to include purchase history, viewing history, subscription history, etc.

The system may provide all of the necessary functionality for an advertiser to create, run, and manage an advertising campaign—start date, duration, budget, etc.—and manage their bidding on their target users in the Auction, and provide tools and metrics for advertisers to analyze their campaign and bidding.

Here are some examples of how this could be applied. Consider, for example, a scenario where a band is releasing a new album. The band believes that people who like The Rolling Stones, The Who, and Led Zeppelin would be potential customers and fans, so the band bids on users in the US, of any age, of any gender, who have reviewed and recommend any album by The Rolling Stones, The Who, or Led Zeppelin. The band is going on tour on the West Coast. The band wants to advertise to potential customers and fans to make them aware of the tour. The band bids on users who live in Washington, Oregon, California, Arizona, Nevada, Utah and Idaho who have reviewed and recommend any of their albums.

As another example, consider a new movie starring Adam Sandler is being released. The distributor of the film wants to advertise to make people aware of the upcoming release. The distributor bids on users who live anywhere in the US, of any age, who have reviewed and recommended any of Adam Sandler's previous movies.

As an additional example, a luxury jeweler in downtown Chicago wants to advertise to potential customers in an effort to increase sales. The jeweler believes their target market is men and women, 50 and older, who have eaten at any of the high-end restaurants in Chicago. The jeweler bids on users who live in and around Chicago (by specifying city names and/or zip codes), who are 50 and older, are of any gender, who have reviewed any of the high-end restaurants in Chicago: Tru, Seasons, Alinea, Next, etc.

As yet another example, an Aspen Ski Resort wants to attract new customers. They believe their customers are people, 30 and older, who have skied at other high-end ski resorts, who have not skied at theirs. Aspen Ski Resorts bids on users who live anywhere in the US, are 30 and older, who have reviewed and recommend Vail, Park City or Sun Valley, and have not reviewed Aspen.

As yet an additional example, consider a new clothing boutique is opening in the Lincoln Park neighborhood in Chicago. The owners want to advertise their grand opening to potential customers. The owners believe their customer is a woman, 25-40, who lives in Lincoln Park, Lakeview, Bucktown, Wicker Park, River North, Streeterville, Gold Coast, or North Central neighborhoods in Chicago. The owners bid on users who are female, aged 25-40, who live in Lincoln Park, Lakeview, Bucktown, Wicker Park, River North, Streeterville, Gold Coast, or North Central neighborhoods in Chicago.

Finally, consider a restaurateur of an Italian restaurant wants to attract new customers. The restaurateur bids on users whose current location is within 1 mile of the restaurant, who have reviewed other Italian restaurants, who have not reviewed his restaurant.

In an embodiment, a method for personalizing reviews for a user on a social network, includes the steps of: receiving from at least two or more users a rating and a recommendation for a reviewable item, wherein the rating is numerical value in a rating scale, and wherein a recommendation is a binary endorsement; receiving a request from a user to view the ratings and recommendations for one or more reviewable items; determining a combined rating and an combined recommendation for all users of the social network at one or more social degrees for the one or more reviewable items; and displaying, by a user interface, the combined rating and combined recommendation for all users of the social network at one or more social degrees for the one or more reviewable items.

In some embodiments, the one of the one or more social degrees includes all first order connections. Additionally, in some embodiments, the one of the one or more social degrees includes all first order connections, wherein the first order connections users of the social network that the user is following. Further, in some embodiments, the one of the one or more social degrees includes all first order connections, wherein the first order connections include users of the social network that the user has accepted as a friend in the social network. Even further, in some embodiments, the one of the one or more social degrees includes all second order connections, wherein the second order connections include user of the social network accepted as friends by the users of the social network that the user has accepted as a friend in the social network. Moreover, in some embodiments, the one of the one or more social degrees includes all users of the social network. Finally, in some embodiments, the one of the one or more social degrees includes the subset of all users who exceed a threshold similarity to the user, wherein the threshold similarity is determined based on the ratings and recommendations of the user and the ratings and recommendations of each of the all users.

In some embodiments, the request from a user to view the ratings and recommendations for a reviewable item includes a designation of at least one or more social degrees, and wherein the step of displaying, by a user interface, the combined rating and combined recommendation for all users of the social network at one or more social degrees includes displaying the combined rating and combined recommendation for all users of the social network at the designated one or more social degrees.

An objective of the invention is to provide a social component to the system so that a user can form relationships with other users.

An objective of the invention is to calculate and display the median ratings of goods, services, activities and events based on the ratings and reviews created by users of the system, including calculating and displaying the median ratings for groups of users with whom the user has formed relationships (by aggregating rating data for those groups of users and calculating the median ratings).

An objective of the invention is to organize and display user generated content—ratings and reviews, lists, and other content a user may generate—giving priority to content written by users with whom the user has formed a relationship.

An objective of the invention is to enable users to filter content—ratings and reviews, lists, or other content a user may generate—by only retrieving and displaying content created by users with whom the user has formed a relationship.

An objective of the invention is to enable users to compare their content—ratings and reviews, lists, other content—with similar content created by a single user or a group of users in an effort to identify what is unique to each, and what is common to both.

An objective of the invention is to provide reviews that are comprised of several attributes: recommend [such as yes/no], a rating [such as a numerical score] for attribute of the entity being reviewed, and comments.

An objective of the invention is to allow the creation of lists, and the ability to apply tags or metadata to those lists.

An objective of the invention is to enable users to filter lists based on tags or metadata that are attributes of the lists.

An objective of the invention is to enable users to aggregate user content to create one list which shows all of the entities that appear in the content, the number of times each entity appears in the content, and the median ratings each entity has from the users' content.

An objective of the invention is to provide a comprehensive social review system for a wide variety of goods, services, activities, and events, particularly lifestyle goods, services, activities and events.

Additional objectives, advantages and novel features will be set forth in part in the description which follows, and in part will become apparent to those skilled in the art upon examination of the following description and the accompanying drawings or may be learned by production or operation of the examples. The objectives and advantages of the concepts may be realized and attained by means of the methodologies, instrumentalities and combinations particularly pointed out in the appended claims.

Below is a glossary of terms used in the application:

A user is a person who has created an account on the system.

A friendship is formed when two users agree to be friends with one another. The relationship is mutually agreed upon by both users. One user will initiate the friendship through a "friend request", and that request must be accepted by the other user in order to form the "friendship". The connection between users is stored in a database.

A friend is a user of the system with whom the user has formed a friendship.

Users of the system who are "friends of friends" of a user, but not friends with the user are called "Friends +1". Friends +1 share a mutual friend with the user.

A following relationship is when one user wants to "follow" another user. Through functionality provided in the system, one user will indicate they want to follow another user, and a "following relationship" is formed.

The phrase "Who I'm Following" references users of the system who the user has indicated they want to follow.

A Smartphone Apps is a computer applications ("apps") that people download to their smartphones, tablet computers, and other such devices.

A list is a collection of related reviews that a user creates. Examples of lists could be "Favorite restaurants in San Francisco", "Favorite places for brunch in Chicago", "Favorite movies starring Harrison Ford", "Favorite Beatles albums", etc. The items in the "list" are from the same category: restaurants, movies, music albums, etc. A user could not create a list of restaurants and include non-restaurants. One exception is travel. When a user creates a list for travel, the contents of the "travel list"—a "trip"—are Places (see definition below). Places are all related—places a person would visit such as hotels, restaurants, city/state/national parks, museums, etc.—but do not belong to a single category. So a "travel list"—a "trip"—can be comprised of hotels, restaurants, museums, city/state/national parks, shopping districts/malls, aquariums, zoos, gardens, etc. However, a travel list cannot include items that aren't Places: movies, music albums, smartphone apps, books, etc.

A Place refers to a destination which people visit or patronize, that may or not be a business. Here is a partial list of the types of places contemplated: Restaurants, Hotels, National Parks, State Parks, City Parks, Shopping Districts/Malls, Amusement Parks, Ski Resorts, Beaches, Cruise Ships, Other Tourist Attractions (Times Square, Faneuil Hall, Navy Pier, etc.), Golf Courses, Airshows, Aquariums, Zoos, Botanical Gardens, Museums, Planetariums, Sporting Events (Baseball, Basketball, Football, Golf, Hockey, Soccer, Tennis, etc.), Tour Operators/Guides (e.g. a white water rafting tour operator in Colorado, a mountain bike tour operator/guide in Utah, etc.), and Other places of business.

A Location refers to geography, be it a geographic point, or a larger geographic area or region. A Location may refer to a very specific spot on the planet (defined by geographic coordinates such as latitude and longitude), or a Location may refer to a geographic region such as a city (e.g. Chicago), a state (e.g. Illinois), or a country (e.g. the United States of America).

Places and Locations have a relationship with one another.

A Place has a specific Location from a geographic coordinates standpoint—the Lincoln Park Zoo is at 41.921375°N 87.633841°W—as well as belonging to a Location from a region standpoint—the Lincoln Park Zoo is in Chicago, which is in Illinois, which is in the United States of America.

A Location as a region can contain Places (e.g. New York City contains restaurants, museums, shopping districts, zoos, parks, etc.).

A Location as geographic coordinates can be near Places (e.g. Places near 38.892093°N 77.031964°W—the corner of Constitution Ave NW and 14th St NW, Washington D.C.—are the Washington Monument, the Lincoln Memorial, the US Capitol Building, the White House, the Jefferson Memorial, etc.).

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 4 is an example of a Business details screen of the social review system illustrating a restaurant.

FIG. 5 is an example of a list screen of the social review system illustrating a restaurant list.

FIG. 8 is an example of an advanced search results screen of the social review system illustrating the results of an advanced restaurant search.

FIG. 9 is an example of a compare reviews screen of the social review system illustrating two comparisons: 1) the comparison of restaurant reviews between the user and another user (top row) and 2) the comparison of restaurant reviews between the user and all of the user's friends (bottom row).

FIG. 10 is an example of a travel review screen of the social review system illustrating a travel review of a city.

FIG. 11 is an example of a city screen of the social review system illustrating summary rating and review statistics for a city.

DETAILED DESCRIPTION OF THE INVENTION

Figure 1:
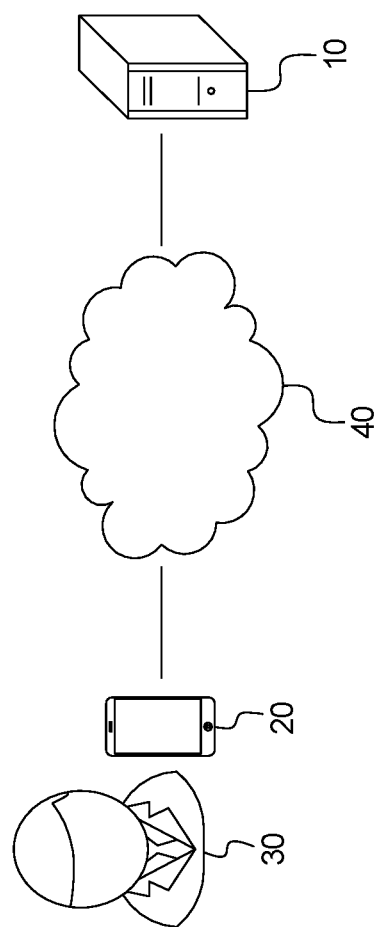
FIG. 1 is a diagram illustrating the ecosystem of an example of the social review system.

FIG. 1 illustrates the ecosystem of an example of a social review system 10. As shown in FIG. 1, using a user device 20, a user 30 may access the social review system 10 over a network 40, such as the Internet. The social review system 10 may include various databases to store data associated with functionality provided.

Users 30 may create an account to use the social review system 10. A user 30 may create an account during a registration or signup process. A user 30 may provide data to create an account, and the social review system 10 may save this data in a database of the social review system 10. A user's account may include data elements such as: Name, Date of Birth, Gender, Home Zip Code, Email Address, Password, and Photo.

In order to access to the social review system 10, the user 30 may be asked to login by providing their unique identifier (email address or username) and password. If the password matches the user's unique identifier, the user 30 will be logged into the social review system 10. If not, the user 30 may be re-prompted to login. If a user 30 forgets their password, a user 30 may request their password be reset. Once logged in, a user 30 may access and manage their account information by going to an Account screen. On that screen, a user 30 may be able to make changes as necessary (update their photo, update their email address, update their name, etc.). Another element the social review system 10 may store about a user 30 would be their "Current Location". This is a data element separate from their Home Zip Code. Home Zip Code would be the user's zip code at their home. Current Location may be the user's current location, which may differ from their Home Zip Code. Upon signing up, a user's Current Location would be defaulted to their Home Zip Code. A user 30 may have control to set their Current Location using controls in the application, notably buttons in the Search Header: "Make this my current location", and "Set current location to home". A user 30 may be able to update their Current Location to a new location by entering a location in the Location Field and then activating the button "Make this my current location". This may update their Current Location to the location specified. Separately, a user 30 may be able to update their Current Location to their Home Location by activating the button "Set current location to home". This may update their Current Location to their Home Zip Code.

Users 30 may be able to create a network of friends within the social review system 10. A user's group of friends defines their social network. This network is a subset of all the users 30 of the system. A friend connection is formed between two users 30 of the system. A friend connection may only be created if both parties agree to be friends with one another. To form a friend connection, one user may initiate the connection by sending a request to another user 30—their "friend". The friend may be notified of the request. The friend may either accept the request, or reject the request. If a friend request is accepted, a connection between the user 30 and the friend will be made. They will be "friends", and special processing may be performed based on this connection. This connection may be stored in a database. If the friend request is rejected, the user 30 and the friend will not be friends, and processing that pertains to non-friends may be performed between the user and the friend.

Users 30 may be able to request friend connections with their friends—their Social Network—using a variety of input methods such as, but not limited to, typing in their friends' email addresses, importing their email address book from their email provider, importing their social graph from Facebook, importing their social network information from other sources, or making a request through the social review system 10. The social review system 10 may store in a database these friend requests and the appropriate identifiers: friends' email addresses, friends' Facebook user ids, friends' user ids, etc. When a user 30 registers, the user 30 may have the option of inviting their friends to join the social review system 10 and become part of their social network by entering their email addresses, importing their email address book, importing their social graph from Facebook, or importing other social network information from other sources. Once logged in, users 30 may be able to manage their social network using a Friend Requests screen and the Friends screen.

A Friend Requests screen may list all of the user's friend requests. On this screen, the user 30 may be able to manage their social network by accepting friend requests from other users 30, by removing friend requests they have sent to friends, or re-sending existing requests to Friends. The user 30 may also send out new requests to other friends by entering their email addresses, importing their email address book, importing their social graph from Facebook, or importing other social network information from other sources.

The Friends screen may list all of the user's friends. On this screen, the user 30 may be able to manage their social network by removing a friend connection (ending a friendship), or by sending out requests to other friends by entering their email addresses, importing their email address book, importing their social graph from Facebook, or importing other social network information from other sources.

Figure 2:
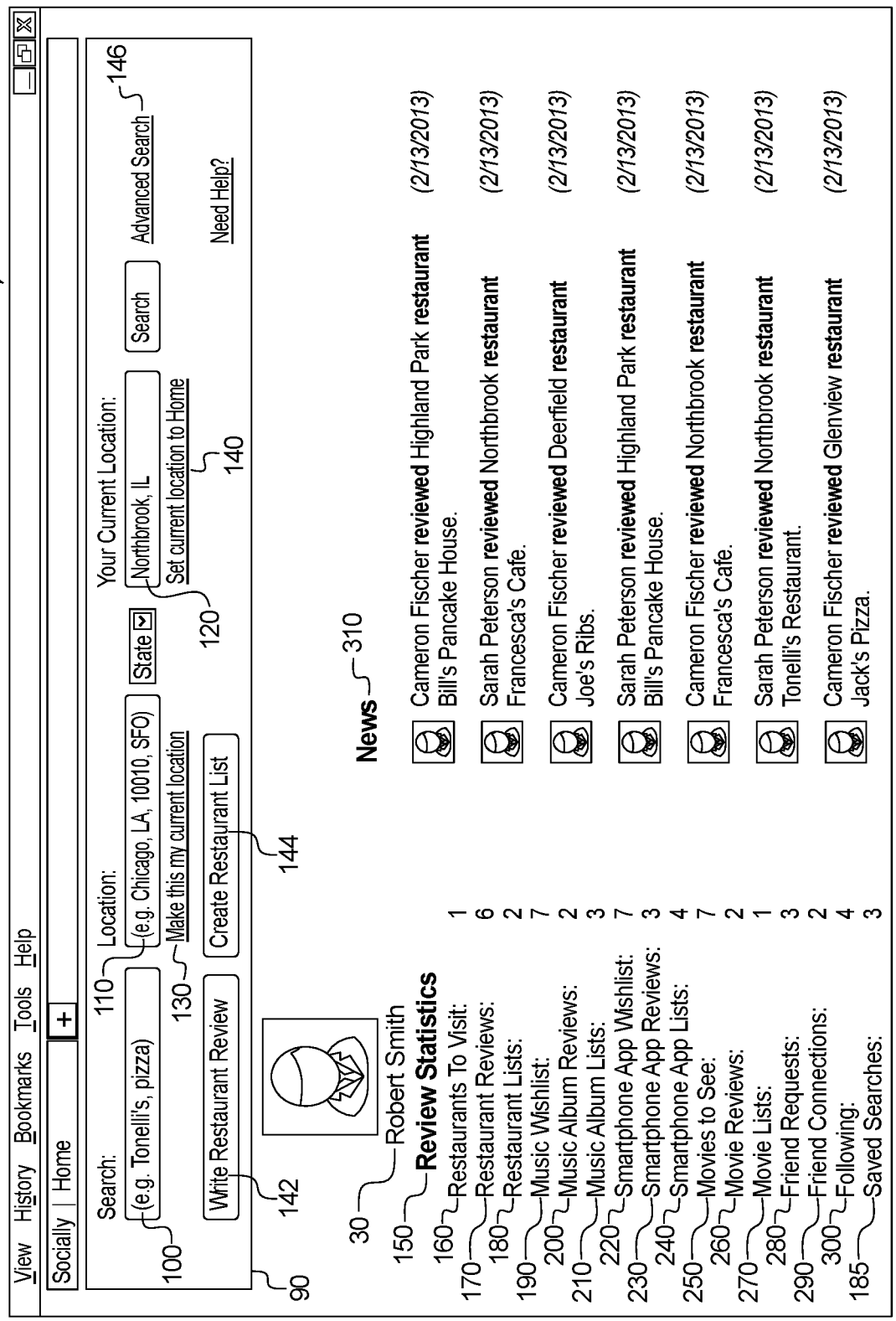
FIG. 2 is an example of a Home screen of the social review system.

As shown in FIG. 2, after the user 30 successfully logs in, the user will be taken to a Home screen 60. The Home screen 60 may be the control center for the user's experience while logged in, and may probably be the most frequently visited screen by a user 30. The Home screen 60 may comprise several sections, for example: Search Header 90, Review and User Statistics 150, News 310, etc.

Figure 3:
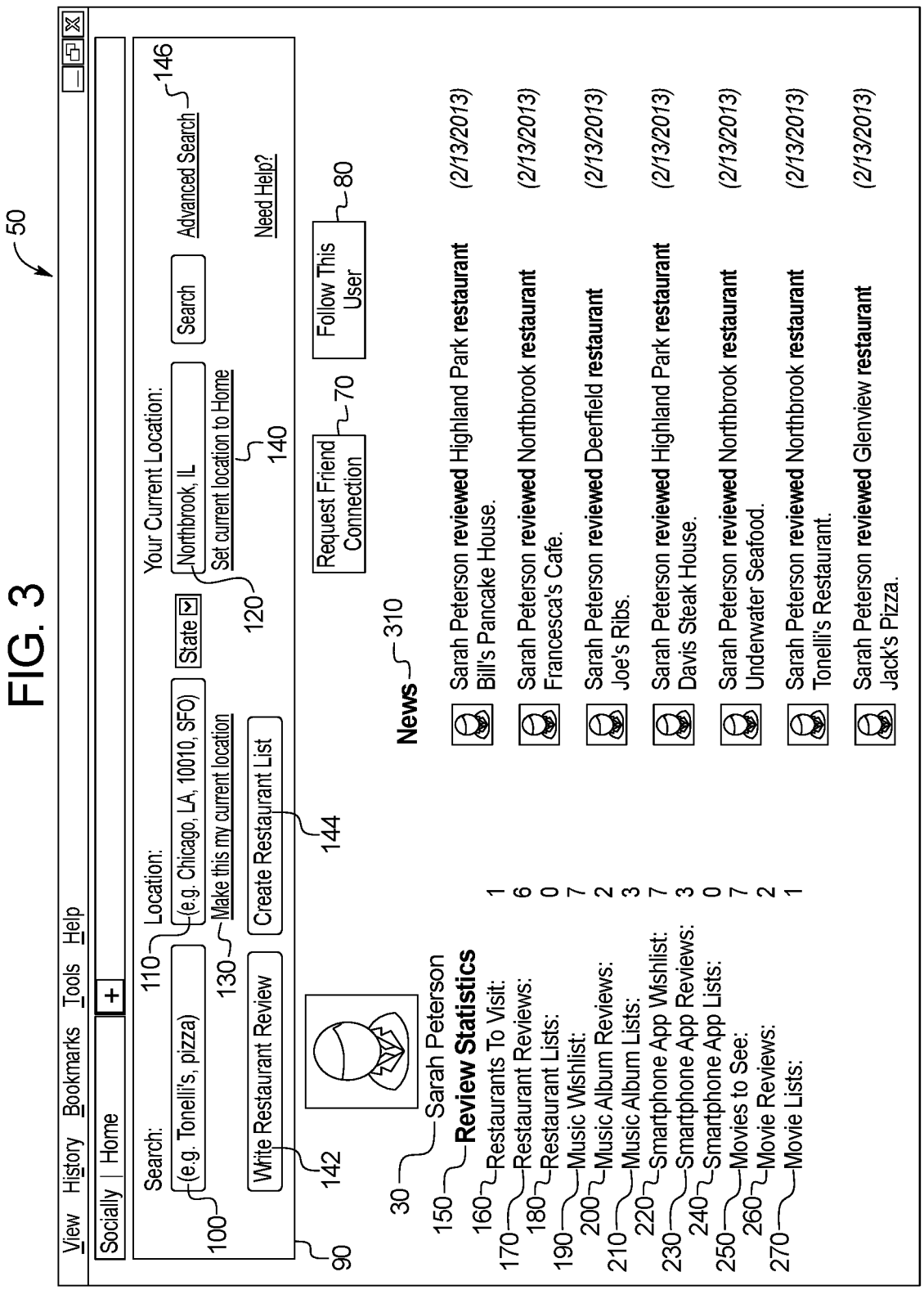
FIG. 3 is an example of a Profile screen of the social review system for a user other than the logged in user.

As shown in FIG. 3, a Profile screen 50 is very similar to the Home screen 60 and is comprised of the same sections as the Home screen 60. A Profile screen 50 may show the profile of another user 30. The Profile screen 50 is displayed when a user 30 activates the hotlink of another user 30 when using the social review system 10.

As shown in FIG. 2, a Search Header 90 may be provided and would be the primary control of the application and drive most of the actions a user 30 will perform in the social review system 10. The Search Header 90 may appear on the Home screen 60, and many other screens throughout the social review system 10. The Search Header 90 may include the following fields: the Search field 100, Location field 110, Current Location field 120, Advanced Search 146, as well as buttons to initiate a search, Make this my current location 130, Set current location to home 140, Write Review 142, Create List 144.

The Search field 100 may be the field in which the user 30 specifies for what they are searching, such as a restaurant name (e.g. Tonelli's), the name of a cuisine (e.g. Italian), the name of a band (e.g. the Beatles), the name of a smartphone app (e.g. New York Times news smartphone app), or the name of any entity in any data category in the social review system 10.

Data categories may be collections of related data. Some data categories supported by the system may be: restaurants, music (bands, albums, songs; e.g. the band the Beatles, the album "Help!", the song, "Yesterday", etc.), smartphone and tablet applications (e.g. The Weather Channel's weather app, the New York Times news app, etc.), movies (e.g. "Casablanca", "Star Wars", etc.), travel related data categories.

A Location field 110 may be the field in which the user 30 specifies a location 520 in which to search for the entity they entered in the Search field 100. This field may editable, and optional. A Current Location field 120 may be the user's current location 520. The Current Location field 120 may not be editable and may state what the user's current location 520 is. Controls may exist in the Search Header 90 to update the value of the Current Location 520, e.g., a "Make this my current location" control 130, and "Set current location to home" control 140. When searching for something, if a user 30 specifies a location 520 in the Location field 110, the system may search for the entered entity in the Search field 100 in the location 520 specified in the Location field 110. If a user 30 does not specify a location 520 in the Location field 110, the social review system 10 may search for the entered entity using the user's Current Location field 120. Thus, the Current Location 520 may be the default search location for a user 30. If the user 30 does specify a location 520 in the Location field 130, that location 520 may override their Current Location 520 and may be the location in which the system searches for the entity.

The social review system 10 may include Review and User Statistics 150 that list statistical information about the user's content—reviews, lists 405 (including wishlists 405), saved searches—and social relationships with other users 30 on the social review system 10. For example, a Restaurants to Visit statistic 160 may list number of restaurants the user has indicated they wish to visit on their Restaurant Wishlist 405. Additionally, a Restaurant Reviews statistic 170 may display the number of restaurant reviews 360 the user 30 has written. A Restaurant Lists statistic 180 may list the number of restaurant lists 405 the user 30 has created. A Saved Restaurant Searches statistic 185 may be displayed along with the names of any Advanced Restaurant Searches the user have saved.

Similarly, Review and User Statistics 150 may include Music statistics. For example, a Music Wishlist statistic 190 may list number of music albums on the user's wishlist 405. Similarly, a Music Album Reviews statistic 200 may list number of music album reviews 360 the user 30 has written. A Music Album Lists statistic 210 may list the number of music album lists 405 the user 30 has created. Saved Music Album Searches may list names of any Advanced Music Album Searches the user has saved.

Likewise, Review and User Statistics 150 may include Smartphone App statistics. A Smartphone App Wishlist statistic 220 may list the number of smartphone apps on the user's Smartphone App wishlist 405. A Smartphone App Reviews statistic 230 may list number of smartphone app reviews 360 the user 30 has written. A Smartphone App Lists statistic 240 may list number of smartphone app lists 405 the user 30 has created. Saved Smartphone App Searches may list names of any Advanced Smartphone App Searches the user 30 has saved.

Moreover, Review and User Statistics 150 may include Movies statistics. A Movies to See statistic 250 may list the number of movies the user 30 has indicated they wish to see in their Movie wishlist 405. A Movie Reviews statistic 260 may list the number of movie reviews 360 the user 30 has written. A Movie Lists statistic 270 may list number of movie lists 405 the user 30 has created. Saved Movie Searches may list names of any Advanced Movie Searches the user 30 has saved.

Even further, in some embodiments, Review and User Statistics 150 may likewise include Travel statistics, such as a Travel Wishlist (Cities to Visit), Hotel Reviews 360, Shopping District/Mall Reviews 360, Beach Reviews 360, Ski Resort Reviews 360, State Park Reviews 360, National Park Reviews 360, Golf Course Reviews 360, Amusement Park Reviews 360, Travel Lists 405, Saved Travel Searches 185, etc.

Finally, Review and User Statistics 150 may include relationship statistics. For example, Friend Requests 280 may include the number of open or pending friend requests the user 30 has received. Additionally, a Friends section 290 may list the number of friend connections the user 30 has with other users 30 on the system. Likewise, a Following section 300 may list the number of people the user 30 is following.

When a user 30 is viewing their Home Screen 60, the News 310 displayed may be the "activity" the user's friends have performed on the social review system 10. Activity may include, but is not limited to, the following actions: writing a restaurant review 360, adding a restaurant to their wishlist 405 (indicating they want to go to a particular restaurant), creating a restaurant list 405, writing a music album review 360 (e.g. a review of the music album the Beatles' album "Let It Be", or U2's album "The Joshua Tree", etc.), adding a music album to their wishlist 405, creating a music list 405, writing a smartphone app review 360, adding a smartphone app to their wishlist 405, creating a smartphone app list 405, writing a movie review 360, adding a movie to their wishlist 405, creating a movie list 405, writing a travel review 360, writing a hotel review 360, writing a ski resort review 360, writing a golf course review 360, writing a shopping mall/district review 360, writing a beach review 360, writing a state park review 360, writing a national park review 360, indicating they want to travel to a particular city.

When a user 30 is viewing another user's Profile screen 50, the News 310 a user 30 may see may be the "activity" the other user 30 has performed on the social review system 10, not the activity of the other user's friends. However, when a user 30 is viewing their Home Screen 60, the News 310 displayed may be the "activity" the user's friends have performed on the social review system 10. For example, when Robert Smith is on his Home screen 60, Robert may see the activities his friends have performed: the restaurants they have reviewed, the smartphone apps they have reviewed, the travel lists they have created, etc. When Robert Smith is on his friend Sarah's Profile screen 50, Robert may only see the activity Sarah has performed, the movies she has reviewed, the music albums she has added to her wishlist, etc. Robert may not see the activity of Sarah's friends. Further, when a user 30 is viewing another user's Profile screen 50, the user 30 may not statistics related to the other user's friends—Friend Requests 280, Friend Connections 290, and Following 300—as well as not see the other user's Saved Searches 185.

As shown in FIG. 3, a user 30 may view the Profile of another user 30 by accessing the user's Profile screen 50. When a user 30 goes to the Profile screen 50 of another user 30, if the two users 30 are not friends, a "Request Friend Connection" button 70 may be displayed on the Profile screen 50, which, when activated, may request a friend connection with that other user 30.

Users 30 may be able to "follow" other users 30 in the social review system 10. Unlike a "friend connection", mutual agreement is not necessary for one user 30 to follow another user 30. A user 30 may be able follow another user 30 by clicking the "Follow this User" button 80. Users 30 may be limited to only following other users 30 with whom they are not friends. A User Following screen may list all of the people the user 30 is following. The user 30 may manage whom they are following by adding or removing a user 30 from their "following list".

Turning to FIGS. 4-9, these figures depict screens the social review system 10 may use to support the functions of rating and reviewing, list creation, searching, etc. FIGS. 4-9 depict these screens for Restaurants, however Restaurants may be only one of the various categories of data the social review system 10 may actually support, and these screens and the underlying functions, processes and methods may be applied to various other categories of data. Functionality for restaurants on the social review system 10 may include functions and data pertaining to Restaurants, User Reviews and Ratings of Restaurants 340, Restaurant Lists 405, Restaurant Wishlist 405, Restaurant Search 460, and Advanced Restaurant Search 500. These same functions and screens may be applied to other categories of data.

The social review system 10 may manage a master list of restaurants for which users can search and review. Data about restaurants may be stored in a database. Some of the attributes of a restaurant stored may include: Restaurant Name, Address, City, State, Zip, Neighborhood (optional), Latitude & Longitude, Phone Number, URL, Cuisine(s).

Users 30 may be permitted to write reviews 360 for restaurants. To write a review 360, the user 30 may be able to invoke write restaurant review functionality by 1) specifying a restaurant in the search field 100 and activating the "Write Restaurant Review" button 142, or 2) when a user 30 is on the Restaurant screen 340, a user 30 may be able to activate a "Write Review" button 142 if the user 30 has not written a review 360 for the restaurant, or 3) when a user 30 is on the Restaurant screen 340, a user 30 may be able to activate an "Edit" button 367 if the user has written a review 360 for the restaurant. The user 30 may be taken to the Restaurant Review screen. Once on the Restaurant Review screen, the user 30 may be able to write a new review 360, or update an existing review 360. A user 30 may be able to write a review 360 for any restaurant in the social review system 10. A user 30 may be able to only write one review 360 per restaurant. If the user 30 visits a restaurant more than once and wants to re-review the restaurant, they may be able to update their existing review 360 to reflect their most recent experience, but they may not be able to write a new, separate (second) review 360 for the restaurant.

After a user 30 saves their restaurant review 360, or updates their existing review 360, the social review system 10 may calculate the following values for the restaurant by all users 30 of the social review system 10: a total number of reviews, a percentage of users 30 who recommend the restaurant, an average food rating, an average ambiance rating, an average service rating, and an average cost. These data elements may be stored in a database of the social review system 10.

FIG. 4 is an example of a business details screen 330 of the social review system 10 illustrating a Restaurant details screen 340. The Restaurant details screen 340 may include aggregated information about the restaurant from a database including business information 345, such as: restaurant name, address, city, state, zip, cuisines, URL, etc., as well as median restaurant ratings for various groups of users 30 with whom the user 30 has formed relationships, restaurant reviews 360, restaurant lists 405 on which the restaurant exists, restaurant wishlists 405 on which the restaurant exists.

When on the Restaurant details screen 340 for a restaurant, if the user 30 has not written a review 360 for the restaurant, an Add to Wishlist button 350 may be displayed stating "Add to Wishlist". Activating the Add to Wishlist button 350 may add the restaurant to the user's wishlist 405, which may be saved in a database. If the user 30 has already indicated they wish to visit the restaurant, instead of the Add to Wishlist button 350 being displayed, a "Remove from Wishlist" button may be displayed. Activating the "Remove from Wishlist" button may remove that restaurant from the user's wishlist 405 in a database. When a user 30 writes a review 360 for a restaurant they have indicated they wish to visit, saving the review 360 may remove the restaurant from the user's wishlist 405 in a database. Additionally, if the user 30 has not written a review 360 for the restaurant, a Write Review button 142 may be displayed. Activating the Write Review button 142 may take the user 30 to the Write Restaurant Review screen where the user 30 may be able to write a restaurant review 360 for the restaurant. Conversely, if the user 30 has written a review 360 for the restaurant, an Edit button 367 may appear next to their review 360 of the restaurant. Activating the Edit button may take the user 30 to the Write Restaurant Review screen where the user 30 may be able to update their existing review 360 for the restaurant.

The restaurant details screen 340 may include an Overview section 370. The Overview section 370 may include an overview for the following groups of reviewers: Friends (all of the user's friends who have reviewed the restaurant); Friends+1 (all of the friends of the user's friends who have reviewed the restaurant); Who I'm Following (all of the people the user 30 is following who have reviewed the restaurant); and All (everyone in the system who has reviewed the restaurant). Each group overview may be displayed as a row in the Overview Section 275, for example: Friends overview row 377; Friends+1 overview row 378; Who I'm Following overview row 379; and the All users overview row 380. Each row will display the Total Number of Reviews 371 for the group, as well as the median ratings the group assigned for each category for the restaurant: percentage recommend 372, Food 373, Ambiance 374, Service 375, Cost 376. The social review system 10 will aggregate the ratings for each group of users 30, and calculate the median values for each category for each group.

Individual restaurant reviews 360 for the restaurant may be displayed beneath the overview row 380. Individual reviews 360 may be displayed in this order: if the user 30 has written a review 360 for the restaurant, that review 360 appears first; all reviews 360 written by the user's friends appear next; all reviews 360 written by friends of the user's friends appear next; all reviews 360 written by people the user 30 is following appear next; finally, all other reviews 360 follow. If any of the user's friends have indicated they wish to go to the restaurant, that list of users 30 may appear under the heading, "On Friends' Wishlist". If any of the user's friends have included the restaurant in any restaurant lists 405 they have created, those restaurant lists 405 will appear under the heading "Restaurant Lists."

As shown in FIG. 3, reviews 360 may include several components: Recommend 361 (Yes/No; whether or not the user 30 recommends the restaurant), Food Rating 362 (numerical value representing the user's opinion of the food at the restaurant), Ambiance Rating 363 (numerical value representing the user's opinion of the ambiance at the restaurant), Service Rating 364 (numerical value representing the user's opinion of the service at the restaurant), Cost 365 (user's opinion of the average cost at the restaurant), Comments 366 (user's comments about their experience at the restaurant).

Turning to FIG. 5, users 30 may be permitted to create lists 405 of restaurants to permit the user 30 to group restaurants together according to criteria of the user's choosing. In order to create a list 405, a user 30 may invoke the "Create Restaurant List" functionality using the "Create Restaurant List" button 144. Restaurant List functionality may be location aware, so the location for the Restaurant List may be either 1) the location specified in the Location field 110 in the Search Header 90 (if the user 30 entered a value in this field), or 2) the user's current location (if the user 30 did not enter a value in the Location field 110). After invoking "Create Restaurant List" functionality, the user 30 may be taken to the Restaurant List screen 400 shown in FIG. 5.

As shown in FIG. 5, once on the Restaurant List screen 400, the user 30 may be able to enter a name for the list 405 (e.g. "Favorite Chicago Restaurants") in the name field 410. Optionally, a user 30 may be able to specify a cuisine (e.g. Italian, Mexican, seafood, sushi, etc.) in the cuisine field 420, or a dining type (e.g. breakfast, lunch, dinner, cheap eats, business dinner, date place, special occasion, etc.) in the dining field 430, that apply to the list 405, but not both. The addition of a cuisine or a dining type may allow users 30 to further define the contents of the restaurant list 405 they are making. For instance, "Favorite Restaurants in Chicago", "Favorite French Restaurants in Chicago", "Favorite Cheap Eat Restaurants in Chicago". Finally, a user 30 may have the option of providing a description for the list 405 (e.g. "This is a list of my favorite Italian restaurants in Chicago").

After identifying the city 409, keying in a list name 410, optionally a cuisine 420 or dining type 430, and optionally a description in the description field 440, a user 30 may be able to assign whatever restaurants they wish to their list 405. If the user 30 adds a restaurant they have already reviewed, the restaurant may be added to the list 405. If the user 30 adds a restaurant they have not reviewed, the user 30 may be prompted to write a review 360 for the restaurant before the restaurant will be added to the list 405. The list 405 may be restricted so only restaurants may be added to the list 405. Entities from other data categories—movies, music, smartphone apps, etc.—may be forbidden from being added to a restaurant list 405.

A user 30 may update a list's name 410, cuisine 420 or dining type 430, description 440, or add or remove restaurants from a list 405, at any time they are logged in. This information may be stored in a database.

Figure 6:
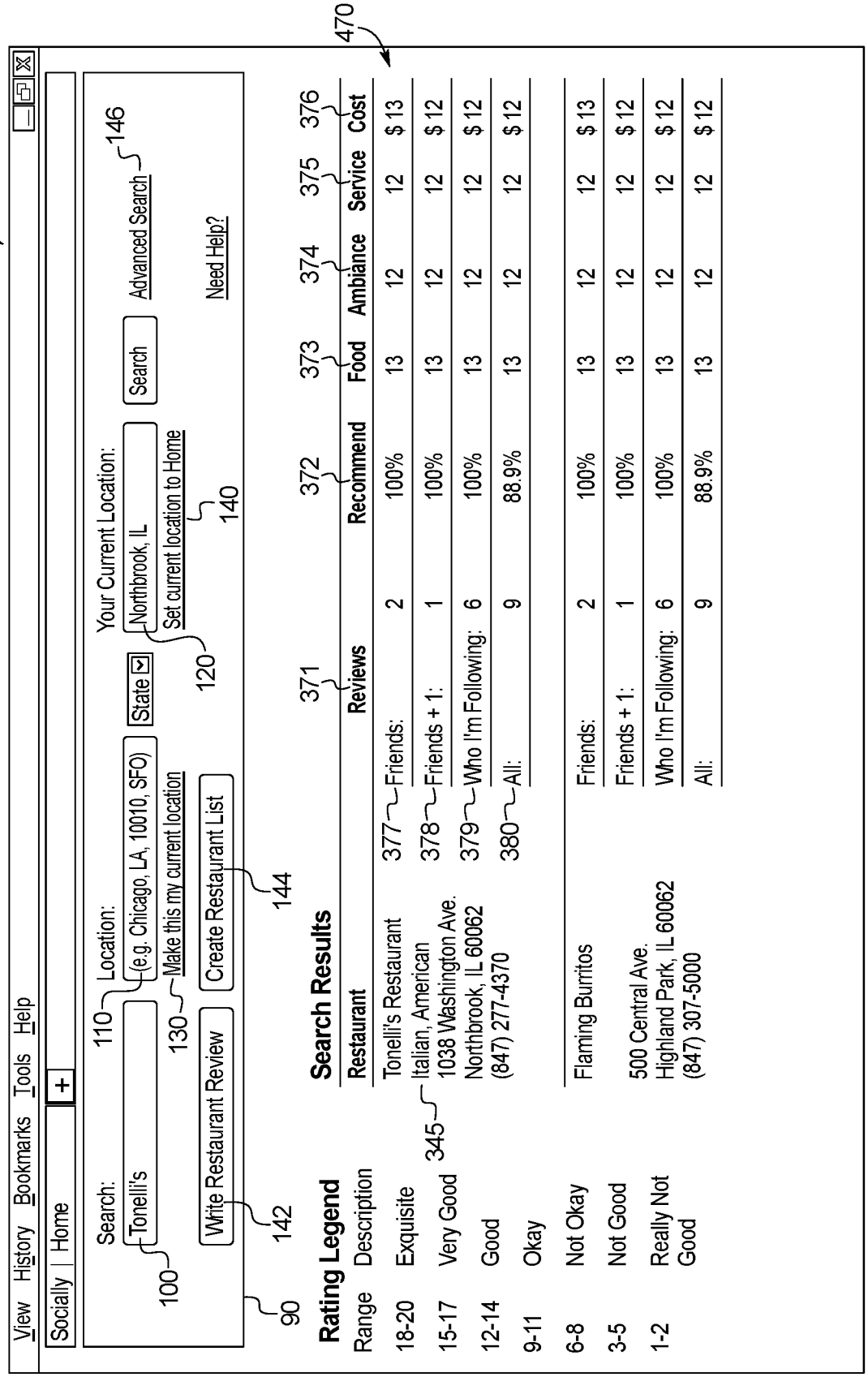
FIG. 6 is an example of a search results screen of the social review system illustrating results for a restaurant search.

As shown in FIG. 6, the social review system 10 may include a Search screen 460. Users 30 may be able to search for restaurants using various methods, for example: searching by restaurant name, searching by type of cuisine, etc. The user 30 may key in a restaurant name into the Search field 100 and activate the search button, which may invoke the social review system 10 to search for restaurants with that name near either 1) the location specified in the Location field 110 in the Search Header 90 (if the user 30 entered a value in this field), or 2) the user's current location specified in the Current Location field 120 (if the user 30 did not enter a value in the location field). The social review system 10 may return search results 470 of restaurants with the name entered by the user 30 for the appropriate location. The user 30 may select one of the restaurants in the search results 470 to view the details of that restaurant, or may perform a new search. Examples of search-by-name include: searching for restaurants named "Tonelli's" in Northbrook, Ill.

If the user 30 keys in a restaurant cuisine in the Search field 100 and activates the search button, the social review system 10 may search for restaurants that serve that cuisine in either 1) the location specified in the Location field 110 in the Search Header 90 (if the user 30 entered a value in this field), or 2) the user's current location (if the user 30 did not enter a value in the Location field 110). The social review system 10 may return search results 470 of restaurants that serve the cuisine entered by the user 30 for the appropriate location. At that time, the user 30 may select one of the restaurants in the search results 470 to view the details of that restaurant, or may perform a new search. Examples of search-by-cuisine include: searching for restaurants serving "Pizza" in Burbank, Calif.

Figure 7:
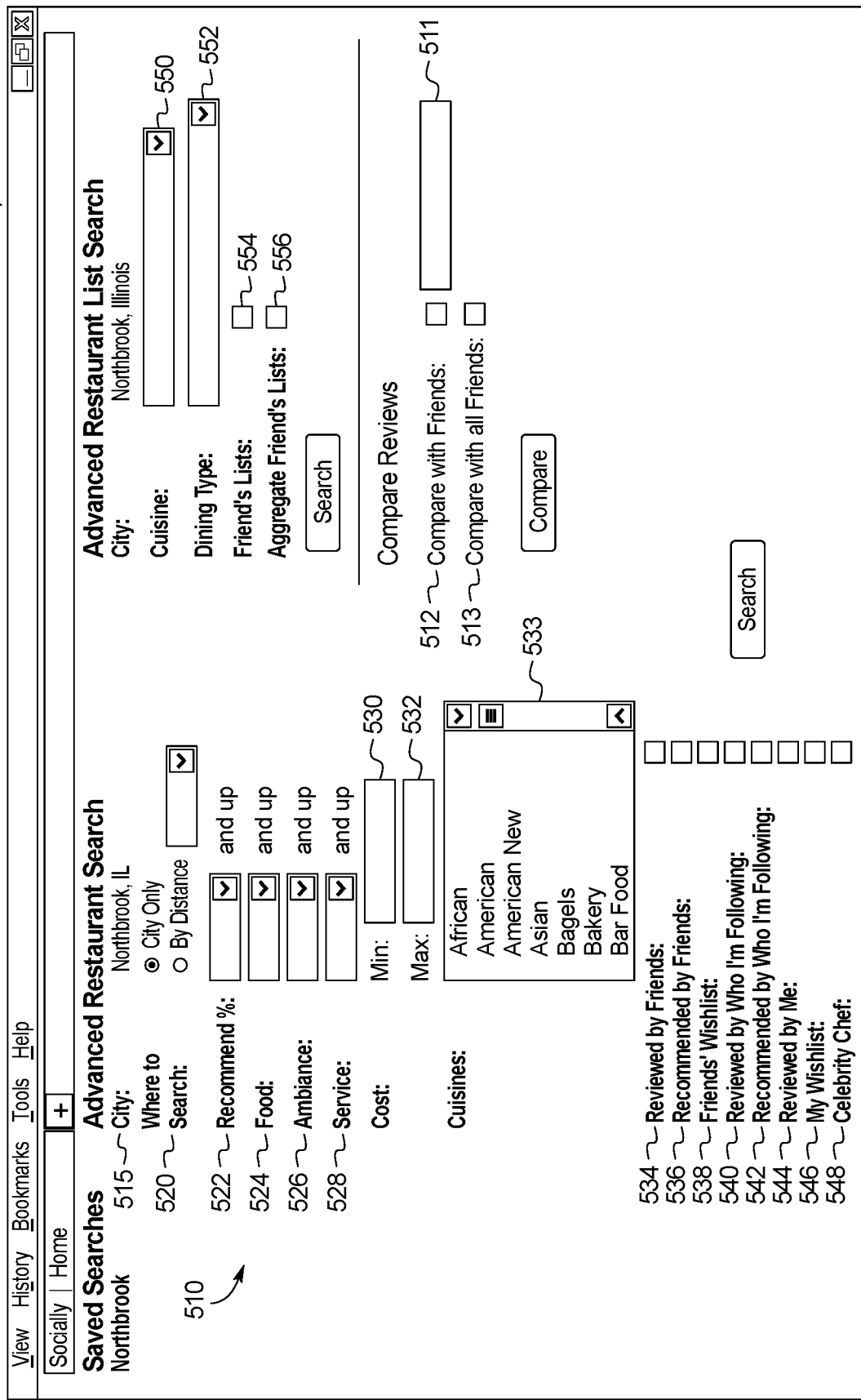
FIG. 7 is an example of an advanced search screen of the social review system illustrating fields, criteria, and functions which may be used in an advanced restaurant search.

As shown in FIG. 7, the restaurant search feature may include Advanced Restaurant Search functionality to permit users 30 to leverage additional criteria to search for restaurants. To begin an advanced search, the user 30 may invoke "Advanced Restaurant Search" functionality 146 that may take the user 30 to the Advanced Restaurant Search screen 500. Advanced Restaurant Search functionality may be location aware, so the location (city) 515 Advanced Restaurant Search may use may be either 1) the location specified in the Location field 110 in the Search Header 90 (if the user 30 entered a value in this field), or 2) the user's current location (if the user 30 did not enter a value in the Location field 110). On this screen, the user 30 is able to search for restaurants using the Advanced Restaurant Search criteria 510 by filling in various fields. All of the fields are optional, and any number of criteria may be selected and combined with other criteria.

Some examples of Advanced Restaurant Search criteria 510 include: city 515; location 520 (selects the geographical area the search should be restricted to, may include options such as "City only", "Within a certain distance" of the specified location, or "Neighborhood only," e.g., restaurants only in Chicago, or restaurants within twenty-five miles of Chicago, or restaurants in the Lincoln Park neighborhood in Chicago); minimum recommendation percentage 522 (selects restaurants where the percentage of reviewers who recommend the restaurant is above a certain threshold, e.g. restaurants where at least 70% of the reviewers recommend the restaurant); minimum food rating 524 (selects restaurants where the average food rating is above a certain value); minimum ambiance rating 526 (selects restaurants where the average ambiance rating is above a certain value); minimum service rating 528 (selects restaurants where the average service rating is above a certain value); minimum cost 530 (selects restaurants where the average cost is above a certain amount); maximum cost 532 (selects restaurants where the average cost is below a certain amount); cuisine(s) served 533 (selects restaurants that serve at least one of the cuisines selected as multiple cuisines may be selected, e.g. restaurants that serve steak or seafood); reviewed by friends 534 (limits search to restaurants reviewed by the user's friends); recommended by friends 536 (limits search to restaurants recommended by the user's friends); friends' wishlists 538 (limits search to restaurants on user's friends' wishlists); Reviewed by Who I'm Following 540 (limits search to restaurants reviewed by people the user 30 is following); Recommended by Who I'm Following 542 (limits search to restaurants reviewed and recommended by people the user 30 is following); Reviewed by Me 544 (limits search to restaurants reviewed by the user 30); My Wishlist 546 (limits search to restaurants on the user's wishlist); and restaurants with a celebrity chef 548 (limits search to restaurants owned by chefs who are public figures through their participation in television programs and other related media, their presence on the Internet, having written popular cookbooks, etc. are considered, e.g., restaurants owned by Bobby Flay, Mario Batali, Emeril Lagasse, etc.).

Further shown in FIG. 7, similar to Advanced Restaurant Search, the social review system 10 may include an Advanced Restaurant List Search to search for restaurant lists 405. The advanced list search criteria may include: cuisine 550 (limiting the results by choice of cuisine, e.g. restaurant lists 405 tagged with Greek cuisine); Dining Type 552 (limiting the results by a type of dining, e.g. restaurants lists 405 for the city that are "dinner", restaurants lists 405 for the city that are "breakfast", restaurants lists 405 for the city that are "special occasion", restaurant lists 405 for the city that are "cheap eats", etc.); friends' lists only 554 (limiting to only restaurant lists 405 authored by the user's friends); and aggregate friends' lists 556 (aggregates the contents of lists 405 by the user's friends' that meet the criteria to create one list 405, and that shows the number of times each restaurant appeared on the lists 405, along with the ratings). All of the fields may be optional. A cuisine or a dining type may be selected, but selecting both may be disallowed.

Additionally shown in FIG. 7, similar to Advanced Restaurant Search, the social review system 10 may include Compare Reviews which would compare the user's reviews 360 with the reviews 360 of their friends in the social review system 10. The compare reviews criteria may include: compare with friend 512 (indicating the comparison will be done with a specific friend); friend's name field 511 (name of the friend with whom the comparison should be performed); compare with all friends 513 (indicating the comparison will be done with all the user's friends). If compare with friend 512 is selected, the friend's name field may be required. Compare with friend 512 or compare with all friends 513 may be selected, but selecting both may be disallowed.

Turning to FIG. 8, performing an Advanced Restaurant Search may return an Advanced Search Results screen 560 including a set of search results 470 of the restaurants 345 that meet the criteria specified. At that time, the user 30 may select one of the restaurants in the search results 470 to view the details of that restaurant, or perform a new search. Examples of this type of search may include: Restaurants within ten miles of Burbank, Calif., that have a sixty percent recommendation score, that serve "pizza"; Restaurants in Chicago, Ill., that have a food score of fifteen or higher, an ambiance score of fourteen or higher, a service score of fourteen or higher, that serve "seafood" or "Italian" food; Restaurants in San Francisco, that serve "Mexican" food, that my friends have reviewed; Restaurants in Washington, D.C., that serve "Chinese" food or "Thai" food, that my friends recommend; Restaurants in New York, that my friends wish to visit; Restaurants in Miami, that serve "Latin American" food, that "people I'm following" have reviewed; Restaurants in Los Angeles, that serve "Japanese" food or "Korean" food, that "people I'm following" recommend.

After performing an Advanced Restaurant Search, the user 30 is able to save the criteria of that search. There may be a "Save" button 564 at the bottom of the search results 470. The user 30 may provide a name for the search in the search name field 562, activate the "Save" button 564, and the search criteria may be saved to a database. This search may be made only accessible and executable by the user 30. Other users may be refused access to view or run other user's saved searches. The list of a user's saved restaurant searches 185 may appear on their Home screen 60 and on the Advanced Restaurant Search screen 500. The user 30 may run any of their saved searches by activating a hotlink for the saved search. Appropriate links may be displayed for the user 30 to edit a saved search. Activating the edit function may take the user 30 to a Saved Restaurant Search screen where the user 30 may be able to modify any of the criteria of the search except the city 515.

Performing the Advanced Restaurant List Search may return a set of restaurant lists 405 that meet the criteria specified. At that time, the user 30 may select one of the restaurant lists 405 in the search results to view the details of that restaurant list 405, or perform a new search. When viewing the restaurant list 405, the user 30 may further drill down to view the details for any of the restaurants in the list 405. Examples of this type of search are: restaurant lists 405 for Los Angeles with the cuisine "sushi"; restaurant lists 405 for San Francisco with dining type "special occasion"; restaurant lists 405 for Chicago written by my friends. Additionally, the Aggregate Friends' Lists 556 function may aggregate the contents of lists by the user's friends for the criteria specified (city, cuisine, dining type) to create one list which may show the number of times each restaurant appeared on the lists, along with the median ratings for each restaurant for each category by the friends who added those restaurants to their list 405 (e.g. aggregate all lists by friends for Chicago steakhouses; aggregate all lists by friends for Los Angeles for breakfast; etc.).

Turning to FIG. 9, Advanced Restaurant Search may include further advanced features to permit comparisons of reviews between users. For example, Compare with Friend 512 functionality may compare the user's reviews 360 with the reviews 360 of one of their friends. In order to perform this functionality, the user 30 may select the Compare with Friend 512 option, key in their friend's name in the name field 511, and activate the compare button. The social review system 10 may compare the user's restaurant reviews 360 and the friend's restaurant reviews 360 and may categorize the results of the comparison: Unique to You 610, Common to Both 620, Unique to Friend 630. Restaurants that only the user 30 has reviewed may appear in the Unique to You 610 section. Included may be the user's reviews for those restaurants. Restaurants that both the user and the friend have reviewed may appear in the Common to Both 620 section. Included may be the user's reviews 360, as well as the friend's reviews 360 for each restaurant. Restaurants that only the friend has reviewed may appear in the Unique to Friend 630 section. Included may be the friend's reviews for those restaurants.

The Comparison screen 600 may also be used to display the results of a Compare with All Friends 513 function. The Compare with All Friends 513 function compares the user's reviews 360 with the reviews 360 of all of their friends, in aggregate. In order to perform this functionality, the user 30 may select the Compare with All Friends 513 option, and activate the compare button. The social review system 10 may compare the user's restaurant reviews 360 and the restaurant reviews 360 of all of their friends and may categorize the results of the comparison: Unique to You 610, Common to All 640, Unique to All Friends 650. Restaurants that only the user 30 has reviewed may appear in the Unique to You 610 section. Included may be the user's reviews for those restaurants. Restaurants that both the user and all their friends have reviewed may appear in the Common to All 640 section. Included may be the user's reviews 360, as well as the median ratings by all of the friends for each restaurant. Restaurants that the user 30 has not reviewed that their friends have reviewed may appear in the Unique to All Friends 650 section. Included may be the median ratings by all of the friends for those restaurants. FIGS. 4 through 9 illustrated the social review system 10 in the context of restaurants. However, it is contemplated that the social review system 10 may be configured such that users 30 may perform all the functionality described for a variety of categories of goods, services, activities and events. For example, the social review system 10 may include a music section for music processing. Music processing on the website includes functions and data pertaining to music, bands, albums, songs, user reviews and ratings of music, music lists, music wishlists, music search, and advanced music search. Music processing shares many of the same features and functionality as restaurant processing, but instead of restaurants, music—bands, albums, and songs—serves as the domain for these functions.

The social review system 10 may manage a master list of musical bands (e.g. the Beatles, U2, etc.), music albums (e.g. "Let It Be", "The Joshua Tree", etc.), songs (e.g. "The Long and Winding Road", "Where the Streets Have No Name", etc.), and the relationships between bands, albums, and songs (e.g. the Beatles recorded an album entitled "Let It Be" and one of the tracks on the album is "The Long and Winding Road"; U2 recorded an album entitled "The Joshua Tree" and one of the tracks on the album is "Where the Streets Have No Name"; etc.). This data may be used to allow users 30 to search and review music albums and songs.

Data about bands, albums, and songs may be stored in a database. Some of the attributes of a band that may be stored include: band name, year formed, year disbanded, and home city. Some of the attributes of an album to be stored are: album name, year recorded, genre(s), etc. Some of the attributes of a song to be stored are: song name; track number; and song duration.

Users 30 may be permitted to upload their digital music library, if they have a digital music management application such as iTunes, to the social review system 10. This process would not upload the content of the music, but the metadata of the library, such as the names of artists, albums and songs. To perform the upload, the user 30 may invoke the "Upload Music Library" functionality. The user 30 may then be taken to the Music Library screen. On the "Upload Music Library" screen there may be a field for the path to the user's digital music library, followed by a "Browse" button, and underneath may be an "Upload" button. The screen may also display the current contents of the user's library. The user 30 may be able to specify the location of their digital music library using the "Browse" button by graphically navigating to the location of their library. For instance, if the user 30 has an iTunes digital library of music, the user 30 would navigate to the path "C:\Documents and Settings\Username\My Documents\My Music\iTunes" if using Windows XP, or "C:\Users\Username\My Music\iTunes" if using Windows 7 or 8. For iTunes, this directory may contain a file named, "iTunes Music Library.xml". Once the location of the library has been specified, the user 30 may activate the "Upload" button. This may upload the xml file of the library into the system. The system may then parse the iTunes xml file into the albums and songs the user 30 has in their library. This data may be stored in a database. Once uploaded, the user 30 may be able to view the titles in their library. If the user 30 acquires additional music, they could follow these same steps to re-upload their library. Similar processing to upload music libraries from Android and Windows platforms may also be provided.

The social review system 10 may permit users 30 to write music reviews 360 for albums. This Music Reviews and Ratings section may have very similar functionality to Restaurant Reviews and Ratings. Users 30 may select an album to review and rate by either 1) searching for the album—using Music Search, or Advanced Music Search—and selecting a particular title from the result set, or 2) by going to their Music Library and selecting a title in their library. Music reviews 360 may include several components: recommend 361 (which may be a Yes or NO recommendation by the user 30); music rating 368 (a numerical value representing the user's opinion of the quality of the music on the album); and comments 366 (any user 30 comments about the music album. Music reviews 360 may be saved to a database. After a user 30 saves their music review 360, or updates their existing review 360, the social review system 10 may calculate the following values for the album: total number of reviews; percentage of users 30 who recommend the album; and the average music rating for the album. These data elements may be stored in a database of the social review system 10.

The social review system 10 may permit users 30 to construct music wishlists 405. Wishlists 405 may include substantially the same functionality as ordinary wishlists 405 in the social review system 10. Using a music wishlist 405, users 30 may be able to indicate albums they want by adding the album to their wishlist 405. This functionality may be similar to the Restaurant Wishlist 405 (Restaurant To Visit) functionality.

Additionally, users 30 may be able to create lists 405 of music. This functionality has much of the same functionality as Restaurant List functionality. For example, users 30 may enter a name of their list 405, and optionally, they may be able to specify the type of list 405 they are creating, of which the following may be options: band, genre, and timeframe. Examples of lists 405 could be "My favorite albums of all time", "My favorite Beatles albums", "My favorite British Invasion albums", "My favorite albums from 1993", "My favorite albums from 2000-2009".

The social review system 10 may include Band screens to aggregate and display information about the band. This screen may be analogous to the Restaurant screen. A Band screen may display information about a particular band—name, year formed, year disbanded, home city, etc.—and the albums they have recorded. For each album recorded, rating information may be displayed and may include: the total number of reviews 371 that have been written for the album; percentage recommend 372 (the percentage of reviews 360 where the reviewer recommends the album over the total number of reviews 360); and an average music rating 368 for the album. Music ratings may be provided for the following groups of reviewers: Friends (all of the user's friends who have reviewed the restaurant); Friends+1 (all of the friends of the user's friends who have reviewed the restaurant; Who I'm Following (all of the people the user 30 is following who have reviewed the restaurant); and All (everyone in the system who has reviewed the restaurant). The groups may be displayed as a Friends overview row 377; a Friends+1 overview row 378; a Who I'm Following overview row 379; and an All users overview row 380. The music rating displayed for each group may be the median rating by the group for that album.

The social review system 10 may include Album screens to aggregate and display information about the music album. This screen may also be analogous to the Restaurant screen. The Album screen may display information about the band who recorded the album, and the album itself—name, year recorded, genre(s), track listing. The following rating information may be displayed for the album: the number of reviews 371 that have been written for the album; percentage recommend 372 (the percentage of reviews 360 where the reviewer recommends the album over the total number of reviews 360); and an average music rating 368 for the album. Music ratings may be provided for the following groups of reviewers: Friends (all of the user's friends who have reviewed the restaurant); Friends+1 (all of the friends of the user's friends who have reviewed the restaurant; Who I'm Following (all of the people the user 30 is following who have reviewed the restaurant); and All (everyone in the system who has reviewed the restaurant). The groups may be displayed as a Friends overview row 377; a Friends+1 overview row 378; a Who I'm Following overview row 379; and an All users overview row 380. The music rating displayed for each group may be the median rating by the group for that album. The individual reviews 360 for the album may appear beneath the ratings.

Individual reviews 360 may appear in the following order: if the user 30 has written a review 360 for the album, that review 360 appears first; all reviews 360 written by the user's friends appear next; all reviews 360 written by friends of the user's friends appear next; all reviews 360 written by people the user 30 is following appear next; finally, all other reviews 360 follow. If any of the user's friends have the album on their wishlist 405, that list of users 30 may appear under the heading, "Wishlist". If any of the user's friends have included the album in any Music Lists they have created, those music lists 405 may appear under the heading "Album Lists".

In the social review system 10, users 30 may be able to search for music using several methods: keying in a band name, keying in an album name, or keying in a song name. This functionality is very similar to Restaurant Search functionality. The social review system 10 may return search results 470 of all music related entities that contain the name entered by the user 30. The search results 470 may list all bands that met the search criteria, then all albums that met the search criteria, then all songs that met the search criteria. At that time, the user 30 may select one of the results—band, album, or song—in the result set to view the details of that band, album or song, or perform a new search.

Likewise, users 30 may be able to leverage additional criteria to search for music using Advanced Music Search functionality. This functionality may be very similar to Advanced Restaurant Search functionality. The user 30 may invoke "Advanced Music Search" functionality. The user 30 may be taken to the Advanced Music Search screen. On this screen, the user 30 may be able to search for albums using the Advanced Music Search criteria: minimum recommendation percentage 522 (albums where the percentage of reviewers who recommend the album is above a certain threshold, e.g., at least 70% of the reviewers recommend the album); minimum music rating (albums where the average music rating is above a certain value); genre(s) (Albums considered belonging to at least one of the genres; multiple genres may be selected, e.g., albums that are jazz, or blues); Year Recorded, Earliest (Albums recorded on or after that year, e.g., albums recorded since 1995); Year Recorded, Latest (Albums recorded on or before that year, e.g., albums recorded before 1970); reviewed by Friends 534 (limits results to only albums reviewed by the user's friends); recommended by Friends 536 (limits results to only albums reviewed and recommended by the user's friends); Friends' Wishlist 538 (limits results to only albums that are on the user's friends' wishlist 405); Reviewed by Who I'm Following 540 (limits results to only albums reviewed by people the user 30 is following); Recommended by Who I'm Following 542 (limits results to only albums reviewed and recommended by people the user 30 is following); Reviewed by Me 544 (limits results only to albums reviewed by the user 30 or to exclude albums reviewed by the user 30); and My Wishlist 546 (limits results to only albums on the user's wishlist 405). All of the fields may be optional, and any number of criteria may be selected and combined with other criteria.

Performing the Advanced Music Search may return search results 470 that meet the criteria specified. At that time, the user 30 may select one of the albums in the search results 470 to view the details of that album, or perform a new search. Examples of this type of search may include: albums that have a 60% recommendation score, that are "jazz", that were recorded after 1955; albums that have a music score of 6 or higher, that are "bluegrass" or "gospel", that were recorded before 1950; albums that are "classical", that my friends have reviewed; albums that are "rock and roll", that my friends recommend; albums that are on my friends' wishlists 405; albums that are "Country", that "people I'm following" have reviewed; and albums that are "Hip Hop", that "people I'm following" recommend.

After performing an Advanced Music Search, the user 30 may be able to save the criteria of that search. This functionality may be similar to Saved Restaurant Searches functionality. The user 30 may provide a name for the search, and activate the "Save" button 564.

Users 30 may also be provided Advanced Music Search Compare functions similar to the compare functions in Advanced Restaurant Search. The "Compare with Friend" function may compare the user's reviews 360 with the reviews 360 of one of their friends specified in the name field 511. This function may select albums the user 30 has reviewed, albums the friend has reviewed, then may categorize the results of the comparison: Unique to You 610, Common to Both 620, Unique to Friend 630. The "Compare with all Friends" function may compare the user's reviews 360 with the reviews 360 of all of their friends, in aggregate. This function may select albums the user 30 has reviewed, albums the user's friends have reviewed, then may categorize the results: Unique to You 610, Common to All 640, Unique to All Friends 650. Users 30 may be able to search for music lists 405 using Advanced Music List Search functionality. This functionality may be very similar to Advanced Restaurant List Search functionality. The user 30 may invoke "Advanced Music List Search" functionality, and the user 30 may be taken to the Advanced Music List Search screen. On this screen, users 30 may be able to search for music lists 405 using the advanced list search criteria, including: band (music lists tagged for a particular band; only one may be selected, e.g., music lists for "the Beatles", etc.); genre (music lists tagged for a particular genre; only one may be selected, e.g., music lists for "classical music", etc.), timeframe (music lists tagged for a particular timeframe, e.g., music lists for albums "recorded in 2005", music lists for albums "recorded between 1990-1999", etc.); friends' lists only 554 (only music lists authored by the user's friends); and aggregate friends' lists 556 (aggregates the contents of all of the user's friends' lists to create one list 405, and that shows the number of times each album appeared on the lists, along with the ratings). All of the fields may be optional. The options Band, Genre, and Timeframe, may be limited so that only one of each may be selected.

Performing the Advanced Music List Search may return search results of music lists 405 that meet the criteria specified. At that time, the user 30 may select one of the music lists 405 in the search results to view the details of that music list 405, or perform a new search. When viewing the music list 405, the user 30 may be able to further drill down to view the details for any of the albums in the list 405. Examples of this type of search may include: music lists for the band "U2"; music lists for "Jazz" music; music lists for albums recorded in 1968; music lists for albums recorded in between 1980-1989; and music lists for "Rock 'N' Roll" music written by my friends.

The social review system 10 may include a Smartphone App section for Smartphone Apps processing including functions and data pertaining to Smartphone Apps, User Reviews and Ratings of Smartphone Apps, Smartphone App Lists, Smartphone App Wishlists 405, Smartphone App Search, and Advanced Smartphone App Search, where Smartphone Apps are the computer applications ("apps") that people download to their smartphones, computer tablets, and other such devices. A user's Smartphone App Reviews and Ratings may be the smartphone apps the user 30 reviewed and rated. Smartphone App processing may share many of the same features and functionality as Restaurant and Music processing, but instead of restaurants and music, smartphone apps serve as the domain for these functions.

The social review system 10 may manage a master list of smartphone apps (e.g. the Weather Channel's weather app, the New York Times news app, "Angry Birds", "Words with Friends", etc.). This data may be used to allow users 30 to search and review smartphone apps. Data about smartphone apps will be stored in a database in the social review system 10. Some of the attributes of smartphone apps to be stored include: App Name; Type of App (e.g. weather, financial, news, game, etc.); Name of Software Developer; Platforms available (e.g. iPhone, Android, Windows Mobile, etc.); Cost; Filename of app as it appears in the directory (e.g. IMDB app is IMDb.ipa, Wikipedia app is Wikipedia.ipa, etc.); and image of app.

Users 30 may be able to upload their smartphone app library, if they have a smartphone, computer tablet, or similar device, to the social review system 10. This process may not upload the applications themselves (the bits that make up the applications), but the names of smartphone apps they have downloaded. The user 30 may invoke the "Upload Smartphone App Library" functionality. The user 30 may be taken to the Smartphone App Library screen. On the Smartphone App Library screen may be a field for the path to the user's smartphone app library, followed by the "Browse" button with an associated "Upload" button. The screen may also display the current contents of the user's library. A user's Smartphone Library may include the smartphone apps they have downloaded to their smartphone, tablet computer, or similar such device. The user 30 may specify the location of their smartphone app library using the "Browse" button by graphically navigating to the location of their library. For instance, if the user 30 has an iPhone, the user 30 would navigate to the path "C:\Documents and Settings\Username\My Documents\My Music\iTunes\iTunes Media\Mobile Applications" if using Windows XP. For iPhones, this directory will list the filenames of all of the applications they have downloaded (e.g. Dictionary 1.2.0.ipa, IMDb 2.4.2.ipa, Weather 1.0.ipa, Wikipedia 2.2.ipa, etc.).

Once the location of the library has been specified, the user 30 may activate the "Upload" button. This may upload the filenames in the directory into the social review system 10. The social review system 10 may determine what apps the user 30 has downloaded by matching the app filenames with the app filenames stored in a database in the social review system 10, and then storing this information in the database. Once uploaded, the user 30 can view the apps in their library. If the user 30 acquires additional apps, the user 30 may follow these same steps to re-upload their library. Similar processing to upload smartphone app libraries from Android and Windows platforms may be applied.

The social review system 10 may enable users 30 to write reviews 360 for smartphone apps. Smartphone App Reviews and Ratings may have similar functionality to Restaurant Reviews and Ratings, and Music Reviews and Ratings.

To make a review 360, a user 30 may select an app to review 360 and rate by either 1) searching for the app—using Smartphone App Search, or Advanced Smartphone App Search—and selecting a particular title from the result set, or 2) by going to their Smartphone App Library and selecting a title in their library. Smartphone app reviews 360 may be comprised of several components: recommend 361 (which may be a Yes or NO recommendation by the user 30); smartphone app rating 368 (a numerical value representing the user's opinion of the quality of the smartphone app); and comments 366 (any user 30 comments about the smartphone app). After a user 30 saves their smartphone app review 360, or updates their existing review 360, the social review system 10 may calculate the following values for the smartphone app: total number of reviews 360; percentage of users 30 who recommend the smartphone app; and average smartphone app rating. Smartphone app ratings may be saved to a database in the social review system 10.

Users 30 may also be permitted to indicate smartphone apps they want by adding the app to their wishlist 405. This functionality may be similar to the as Restaurant Wishlist 405 and Music Wishlist 405 functionality.

Users 30 may additionally be able to create lists of smartphone apps. This functionality may be similar to Restaurant List and Music List functionality. Users 30 may enter a name of their list 405. And optionally, they may specify the type of list 405 by selecting an app type (e.g. weather, financial, game, movie, etc.). Examples of lists 405 may be "My favorite Smartphone Apps of all time", "My favorite weather apps", "My favorite game apps", "My favorite photography apps".

The Smartphone App screen may aggregate and display information about the smartphone app. This screen may be analogous to the Restaurant screen, Band screen, and Album screen. The Smartphone App screen may display information about the smartphone app—name, type of app (e.g. weather, financial, game, etc.), software developer, cost, on what platforms it is available (e.g. iPhone, Android, Windows Mobile, etc.), etc. The following rating information may be displayed for the smartphone app: number of reviews 371 that have been written for the smartphone app; percentage recommend 372 (percentage of reviews 360 where the reviewer recommends the smartphone app over the total number of reviews 360); and a smartphone app rating may be calculated by averaging the ratings received for the application. Smartphone app ratings may be calculated for the following groups of reviewers: Friends (all of the user's friends who have reviewed the smartphone app); Friends+1 (all of the friends of the user's friends who have reviewed the smartphone app); Who I'm Following (all of the people the user 30 is following who have reviewed the smartphone app); and All (everyone in the system who has reviewed the smartphone app). The groups may be presented in various rows: a Friends overview row 377; a Friends+1 overview row 378; a Who I'm Following overview row 379; and an All users overview row 380. The smartphone app rating displayed for each group would be the median rating by the group for that smartphone app.

The individual reviews 360 for the smartphone app may appear beneath an Overview Section 355. Individual reviews 360 may appear in this order: if the user 30 has written a review 360 for the smartphone app, that review 360 appears first; all reviews 360 written by the user's friends appear next; all reviews 360 written by friends of the user's friends appear next; all reviews 360 written by people the user 30 is following appear next; all other reviews 360 follow. If any of the user's friends have the smartphone app on their wishlist 405, that list of users 30 may appear under the heading, "Wishlist". If any of the user's friends have included the smartphone app in any smartphone app lists 405 they have created, those lists 405 may appear under the heading "Smartphone App Lists".

Users 30 may search for smartphone apps by keying in a smartphone app name (e.g. Wikipedia, IMDb, etc.), or by keying in a type of smartphone app (e.g. games, news, photography, etc.). This functionality may be similar to Music Search functionality. After running a search, the social review social review system 10 may return search results of all smartphone app related entities that contain the name entered by the user 30. The search results 470 may list all smartphone apps that met the search criteria, either apps named after what was entered (e.g. apps named Wikipedia), or apps belonging to the category that was entered (e.g. news apps). At that time, the user 30 may select one of the search results 470 in the result set to view the details of that smartphone app, or perform a new search.

Advanced Smartphone App Search may be performed to search for smartphone apps that meet the criteria specified. This functionality may be very similar to Advanced Restaurant Search functionality. The user 30 may begin by invoking "Advanced Smartphone App Search" functionality. The user 30 may be taken to the Advanced Smartphone App Search screen. On this screen, the user 30 may be able to search for smartphone apps using the Advanced Smartphone App Search criteria: minimum recommendation percentage 522 (smartphone apps where the percentage of reviewers who recommend the smartphone app is above a certain threshold, e.g., at least 70% of the reviewers recommend the smartphone app); minimum smartphone app rating (smartphone apps where the average rating is above a certain value); app type(s) (smartphone apps considered being of at least one of the types; multiple types may be selected, e.g., game apps, news apps, photography apps, etc.); reviewed by friends 534 (limit search to smartphone apps reviewed by the user's friends); recommended by friends 536 (limit search to smartphone apps reviewed and recommended by the user's friends); friends' wishlist 538 (limit search to smartphone apps that are on the user's friends' wishlists 405); Who I'm Following reviews only 540 (limits search to smartphone apps reviewed by people the user 30 is following); recommended by Who I'm Following 540 (limits search to smartphone apps reviewed and recommended by people the user 30 is following); Reviewed by Me 544 (limits search to smartphone apps reviewed by the user 30, or may exclude smartphone apps reviewed by the user 30); and My Wishlist 546 (limits search to smartphone apps on the user's wishlist 405). All of the fields are optional, and any number of criteria may be selected and combined with other criteria.

Performing the Advanced Smartphone App Search may return search results 470 of smartphone apps that meet the criteria specified. At that time, the user 30 may select one of the smartphone apps in the result set to view the details of that app, or perform a new search. Examples of this type of search may include: smartphone Apps that have a 60% recommendation score, that are type "news"; smartphone Apps that have a rating of 6 or higher, that are type "dictionary"; smartphone Apps that are "photography", that my friends have reviewed; smartphone Apps that are "movie", that my friends recommend; smartphone Apps that are on my friends' wishlists 405; smartphone Apps that are "financial", that "people I'm following" have reviewed; smartphone Apps that are "games", that "people I'm following" recommend.

After performing an Advanced Smartphone Apps Search, the user 30 may be able to save the criteria of that search. This functionality may be similar to the Saved Restaurant Searches and Saved Music Searches functionality. On the search screen, the user 30 may provide a name for the search, and activate the "Save" button 564.

Users 30 may also invoke special advanced Smartphone App Search functions called "Compare with a Friend" and "Compare with all Friends". These compare functions may be similar to the compare functions in Advanced Restaurant Search and Advanced Music Search.

The "Compare with a Friend" function may compare the user's reviews 360 with the reviews 360 of one of their friends. This function may select smartphone apps the user 30 has reviewed, smartphone apps the friend has reviewed, then may categorize the results of the comparison: Unique to You 610, Common to Both 620, Unique to Friend 630.

The "Compare with All Friends" function may compare the user's reviews 360 with the reviews 360 of all of their friends, in the aggregate. This function may select smartphone apps the user 30 has reviewed, smartphone apps the user's friends have reviewed, then may categorize the results of the comparison: Unique to You 610, Common to All 640, Unique to All Friends 650.

Additionally, users 30 may be able to search for smartphone app lists 405 using Advanced Smartphone App List Search functionality. This functionality may be similar to Advanced Restaurant List Search functionality. The user 30 may invoke "Advanced Smartphone App List Search" functionality. The user 30 may be taken to the Advanced Smartphone App List Search screen. On this screen, users 30 may be able to search for smartphone app lists 405 using the Advanced List Search criteria: type 552 (smartphone app lists tagged for a particular smartphone app type; only one may be selected, e.g., smartphone app lists for "news", smartphone app lists for "movies", etc.); friends' lists only 554 (limits search to smartphone app lists authored by the user's friends); and aggregate friends' lists 556 (aggregates the contents of all of the user's friends' lists to create one list, and that shows the number of times each smartphone app appeared on the lists, along with the ratings). All of the fields may be optional.

Performing the Advanced Smartphone App List Search may return search results including smartphone app lists 405 that meet the criteria specified. At that time, the user 30 can select one of the smartphone app lists 405 in the result set to view the details of that list 405, or perform a new search. When viewing the smartphone app list 405, the user 30 may further drill down to view the details for any of the smartphone apps in the list 405. Examples of this type of search may include: smartphone App lists 405 for the "news"; smartphone App lists 405 for "games" written by my friends.

Additionally, the social review system 10 may include a Movie section for movie processing. Movie processing on the social review system 10 may include functions and data pertaining to Movies, Actors, Writers, Directors, Producers, User Reviews and Ratings of Movies, Movie Lists, Movie Wishlists 405, Movie Search, and Advanced Movie Search. Movie processing may share many of the same features and functionality as Restaurant processing and Music processing, but instead of restaurants and music (bands, albums, and songs), movies serve as the domain for these functions.

The social review system 10 may manage a master list of movies (e.g. "Star Wars", "Raiders of the Lost Ark", "E.T.", etc.), and the actors, writers, directors, and producers who work on movies (e.g. Harrison Ford starred in "Star Wars" and "Raiders of the Lost Ark"; George Lucas directed "Star Wars", and wrote "Star Wars" and "Raiders of the Lost Ark"; Steven Spielberg directed "Raiders of the Lost Ark" and "E.T."; etc.). This data may be used to allow users 30 to search and review movies. Data about movies may be stored on a database in the social review system 10. Some of the attributes of a movie to be stored may include: movie title; poster; year released, genre(s); certificate (e.g. G, PG, PG-13, R, etc.); tagline; synopsis; storyline; duration; budget; gross; director(s); writer(s); actor(s)—lead/principal; actor(s)—supporting; and producer(s).

The social review system 10 may provide functionality for users 30 to write movie reviews 360. Movie Reviews and Ratings have similar functionality to Restaurant Reviews and Ratings. Users 30 may select a movie to review and rate by searching for the movie using Movie Search, or Advanced Movie Search.

Movie reviews 360 may be comprised of several components: recommend 361 (which may be a yes or no recommendation by the user); movie rating 368 (a numerical value representing the user's opinion of the quality of the movie); and comments 366 (any user comments about the movie). After a user 30 saves their movie review, or updates their existing review, the social review system 10 may calculate the following values for the movie: total number of reviews 371, percentage recommend 372 (the percentage of users 30 who recommend the movie); average movie rating.

Users 30 may be able to indicate movies they wish to watch by adding the movie to their wishlist 405. This functionality may be very similar to Restaurant Wishlist functionality.

Users 30 may have the ability to create lists 405 of movies. This functionality may be similar to Restaurant List functionality. Users 30 may enter a name of their list 405. And optionally, the user 30 may specify the type of list 405 using the following options: actor/writer/director/producer; genre; and timeframe. Examples of lists 405 could be "My favorite movies of all time", "My favorite Steven Spielberg movies", "My favorite Harrison Ford movies", "My favorite comedy movies", "My favorite adventure movies", "My favorite movies from 2005", "My favorite movies from 1990-1999".

A Movie screen may include aggregate information about the movie and may be very similar to the Restaurant details screen 340. The Movie Screen may display information about the movie, who directed it, who wrote it, who starred in it, who produced it, the year it was released, the duration, the certificate, the genre(s), etc.

Movie review statistics may be included in an Overview Section 355 for the following groups of reviewers: Friends (all of the user's friends who have reviewed the movie); Friends+1 (all of the friends of the user's friends who have reviewed the movie); Who I'm Following (all of the people the user 30 is following who have reviewed the movie); and All (everyone in the social review system 10 who has reviewed the movie). The following rating information may be displayed for each group: number of reviews 371 that have been written for the movie; percentage recommend 372 (may be calculated as a percentage of reviews 360 where the reviewer recommends the movie over the total number of reviews 360); and an average movie rating. The individual reviews 360 for the movie may appear beneath the ratings. Individual reviews 360 may appear in this order: if the user 30 has written a review 360 for the movie, that review 360 appears first; all reviews 360 written by the user's friends appear next; all reviews 360 written by friends of the user's friends appear next; all reviews 360 written by people the user 30 is following appear next; and all other reviews 360 follow. If any of the user's friends have the movie on their wishlist 405, that list of users 30 may appear under the heading, "Wishlist". If any of the user's friends have included the movie in any movie lists 405 they have created, those movie lists 405 may appear under the heading "Movie Lists".

Users 30 may search for movies by keying in a movie name, or keying in the name of an actor/writer/director/producer, or by searching based on other movie properties. This functionality may be similar to Restaurant Search and Music Search functionality. The social review system 10 may return search results 470 of all movie related entities that contain the name entered by the user 30. The search results 470 may list all movies that met the search criteria, then all actors/writers/directors/producers that met the search criteria. At that time, the user 30 may select one of the results—movie, or actor/writer/director/producer—in the search results 470 to view the details of that movie/actor/writer/director/producer, or perform a new search.

Users 30 may be able to leverage additional criteria to search for movies using Advanced Movie Search functionality. This functionality may be similar to Advanced Restaurant Search and Advanced Music Search functionality. The user 30 may invoke "Advanced Movie Search" functionality. The user 30 may be taken to the Advanced Movie Search screen. On this screen, the user 30 may be able to search for movies using the Advanced Movie Search criteria, including: minimum recommendation percentage 522 (searches for movies where the percentage of reviewers who recommend the movie is above a certain threshold, e.g., at least 70% of the reviewers recommend the movie); minimum movie rating (find movies where the average movie rating is above a certain value); genre(s) (finds movies belonging to at least one of the genres; multiple genres may be selected, e.g., movies that are action, or adventure); In Theaters/Now Showing (may provide options such as searching movies that are 1) currently showing in theaters, 2) currently showing near me, 3) no longer showing in theaters); certificate(s) (finds movies based on certificates: G, PG, PG-13, R; multiple may be selected); awards (finds movies nominated and movies that won an award; such as, Oscar, Golden Globe, BAFTA, Guild awards, etc., e.g., movies nominated for Oscar for Best Actor; movies that won Oscar for Best Picture or Best Director; movies that won Golden Globe for Best Supporting Actress; etc.); year released, earliest (finds movies released on or after year provided, e.g., movies released since 1995); year released, Latest (movies released on or before year provided, e.g., movies released before 1970); people/entertainers (search for movies where the person listed was involved; multiple people may be selected, e.g. movies with Woody Allen; movies with Steve Martin and Robin Williams; etc.); keyword (finds movies with keywords matching what was entered, e.g., time travel, murder, affair, shootout, fish out of water, etc.); plot (movies whose plot description matches what was entered); reviewed by friends 534 (limits search to movies reviewed by the user's friends); recommended by friends 536 (limits movies reviewed and recommended by the user's friends are considered); friends' wishlist 538 (limits search to movies that are on the user's friends' wishlists 405); Reviewed by Who I'm Following 540 (limits search to movies reviewed by people the user 30 is following); Recommended by Who I'm Following 542 (limits search to only movies reviewed and recommended by people the user 30 is following); Reviewed by Me 544 (limits search to movies reviewed by the user 30, may also exclude movies reviewed by the user 30); and My Wishlist 546 (limits search to movies on the user's wishlist 405). All of the fields are optional, and any number of criteria may be selected and combined with other criteria.

Performing the Advanced Movie Search may return search results 470 of movies that meet the criteria specified. At that time, the user 30 may select one of the movies in the search results 470 to view the details of that movie, or perform a new search. Examples of this type of search may include: movies that have a 60% recommendation score, that are "comedies", that are in theaters now; movies that have a movie rating of 6 or higher, that are "action" or "adventure", that were released between 1970 and 1979; movies that are "dramas", that my friends have reviewed; movies that are "film noir", that my friends recommend; movies that are on my friends' wishlists 405; movies that are "documentaries", that "people I'm following" have reviewed; movies that are "mysteries", that "people I'm following" recommend; movies that are "dramas", that were nominated for an Oscar or a Golden Globe; movies that are "dramas", that won an Oscar for Best Actor or Best Actress, released between 1990 and 1999.

After performing an Advanced Movie Search, the user 30 may be able to save the criteria of that search. This functionality may be similar to Saved Restaurant Searches functionality. The user 30 may provide a name for the search, and activate the "Save" button 564.

Users 30 may invoke special Advanced Movie Search functions to compare his or her reviews 360 with a friend or all friends. These compare functions may be very similar to the compare functions in Advanced Restaurant Search. The Compare with A Friend function may compare the user's reviews 360 with the reviews 360 of one of their friends. This function may select movies the user 30 has reviewed, movies the friend has reviewed, then may categorize the results of the comparison: Unique to You 610, Common to Both 620, Unique to Friend 630.

The Compare with All Friends function may compare the user's reviews 360 with the reviews 360 of all of their friends, in aggregate. This function may select movies the user 30 has reviewed, movies the user's friends have reviewed, then may categorize the results of the comparison: Unique to You 610, Common to All 640, Unique to All Friends 650.

Similarly, users 30 may be able to search for movie lists 405 using Advanced Movie List Search functionality. This functionality may be very similar to Advanced Restaurant List Search functionality. First, the user 30 may invoke "Advanced Movie List Search" functionality, then the user 30 may be taken to the Advanced Movie List Search screen. On this screen, users 30 may be able to search for movie lists 405 using the advanced list search criteria including: Actor/Writer/Director/Producers (limit searches to lists tagged for a particular actor/writer/director/producer, e.g., movie lists 405 for "Alfred Hitchcock", movie lists 405 for "Robert DeNiro", etc.); genre (limits search to movie lists 405 tagged for a particular genre, e.g., movie lists 405 for "comedies", movie lists 405 for "dramas", etc.); timeframe (limits search to movie lists 405 tagged for a particular timeframe, e.g., movie lists 405 for movies "released in 2005", movie lists 405 for movies "released between 1990-1999", etc.); friends' lists only 544 (limits search to only movie lists authored by the user's friends); and aggregate friends' lists 556 (aggregates the contents of all of the user's friends' lists 405 to create one list 405, and that shows the number of times each movie appeared on the lists 405, along with the ratings). All of the fields may be optional.

Performing the Advanced Movie List Search may return search results of movie lists 405 that meet the criteria specified. At that time, the user 30 may select one of the movie lists 405 in the search results to view the details of that movie list 405, or perform a new search. When viewing the movie list 405, the user 30 may further drill down to view the details for any of the movies in the list 405. Examples of this type of search may include: movie lists 405 for "Robert DeNiro"; movie lists 405 for "Steven Spielberg"; movie lists 405 for "dramas"; movie lists 405 for movies released in 2011; movie lists 405 for movies released between 2000-2009; and movie lists 405 for "comedies" written by my friends.

Similar functionality and processes that has been outlined for Restaurants, Music, Smartphone Apps, and Movies may be applied to other data categories: hotels; national parks; state parks; city parks; shopping districts/malls; amusement parks; ski resorts; beaches; cruise ships; other tourist attractions (e.g. Times Square, Faneuil Hall, Navy Pier, etc.); golf courses; airshows; aquariums; zoos; botanical gardens; museums; planetariums; sporting events to watch—baseball, basketball, football, golf, hockey, soccer, tennis, etc.; sporting events in which to participate—5k races, marathons, half-marathons, triathlons, mountain biking races, swimming events, etc.; tour operators/guides—e.g. a white water rafting tour operator in Colorado, a mountain bike tour operator/guide in Utah, etc.; other food service providers, such as coffee shops, bakeries, and confectioners; books; television shows/programming; products (e.g. televisions, mobile phones, automobiles, tools, utensils, bikes, cameras, running shoes, etc.); service providers; beauty and cosmetic service providers (e.g. salons, spas, hair stylists, etc.); medical service providers (e.g. doctors, dentists, etc.); professional service providers (e.g. attorneys, accountants, etc.); building service providers (e.g. architects, general contractors, carpenters, plumbers, electricians, roofers, etc.); household service providers (e.g. cleaning, caterers, lawn care, snow removal, etc.); animal service providers (e.g. veterinarians, groomers, day care, dog walking, pet hotels, etc.) and charities.

Turning to FIG. 10, Travel processing on the website may vary from the other data categories. A travel review 580 may capture the reviews 360 and ratings of multiple Places 590, and combine them to form a single list 405 that encompasses the Places 590 the user 30 visited and the activities the user 30 experienced on their trip. Travel processing may allow a user 30 to create and update travel reviews 580 (review and rate a trip they took), to identify destinations to which they wish to visit, to search for travel reviews 580, and to perform advanced searches for travel reviews 580. The data for travel may be comprised of the master data for Places 590, which is defined in the Glossary. Master data for each data category may be maintained and stored on appropriate tables in the database.

Users 30 may be able to write travel reviews 580 for trips they have taken. Travel Reviews and Ratings may be similar to Restaurant Reviews and Ratings. A travel review 580 may be a compilation of the Places 590 to which the user 30 went (and the activities the user 30 experienced) in and around a particular city. A travel review may be made for only one city. A user 30 may create multiple travel reviews 580 for multiple cities (e.g. Los Angeles, New York, Washington D.C., etc.). Further, a user 30 may create multiple travel reviews 580 for the same city (e.g. Los Angeles May 2009, Los Angeles December 2012, etc.). If a user 30 took a trip to multiple cities, the user 30 may have to make multiple travel reviews 580, one for each city the user 30 wishes to review. For instance, if a user 30 took a trip to California and visited San Diego, Los Angeles, and San Francisco, the user 30 may not be able to make a single travel review for "California". Instead, the user 30 may be able to make three travel reviews 580, one for each city visited.

To begin a review, the user 30 may activate the "Write Travel Review" functionality. The user 30 may be taken to a Travel Review screen. The city used for the travel review 580 may be 1) the location specified in the Location field 110 in the Search Header 90 (if the user 30 entered a value in this field), or 2) the user's current location (if the user 30 did not enter a value in the Location field 110).

Once on the Travel Review screen, the user 30 may enter a trip name 582 (e.g. "San Francisco, June 2012", or "New York, September 2010", etc.). Optionally, a user 30 may specify other details of the trip, such as: trip type 584 (e.g. pleasure, business, pleasure and business); traveling companions 586 (e.g. traveled alone, with significant other, with extended family, with young children, with teens, etc.); dates traveled 588 (e.g. Jun. 1, 2013-Jun. 10, 2013); and optionally a description. Examples of lists 405 include "Phoenix, March 2009—pleasure", "Seattle, May 2011—business", etc.

Additionally, the user 30 may be prompted to review and rate this trip. Travel reviews 580 are comprised of several components: trip recommendation 592 (yes/no; whether or not the user 30 recommends the trip); trip rating 594 (numerical value representing the user's opinion of the trip); and trip comments 596 (user's comments about their experience).

After identifying the city, keying in a trip name 582, optionally identifying a trip type 584, traveling companions 586, dates traveled 588, and description, and recommending 592 and rating 594 the trip with any trip comments 596, a user 30 may assign whatever travel related Places 590 and Activities they wish to their travel review 580. The domain of data elements a user 30 may be able to add to their travel review are Places 590 as defined in the Glossary. For instance, a user 30 who traveled to New York City may add to their travel review 580 the following Places 590: a hotel at which they stayed, the Statue of Liberty, Central Park, Times Square, restaurants at which the user 30 dined; Metropolitan Museum of Art; and shopping districts and malls at which they shopped. Similarly, a user 30 who traveled to Seattle may add to their travel review 580 the following Places 590: the hotel at which they stayed; the Space Needle; the airshow the user 30 saw; the restaurants at which the user 30 dined; the Seattle Aquarium; the Washington Park Arboretum; the shopping districts/mall at which they shopped; and the cruise the user 30 took.

If the user 30 adds a Place or Activity they have already reviewed to the trip, the Place or Activity may be added to the travel review. If the user 30 adds a Place or Activity they have not reviewed, the user 30 may be prompted to write a review for the Place or Activity before the Place or Activity is added to the travel review. A user 30 may update a travel review's name, type, dates traveled, description, or add or remove Places 590 and Activities from their list, at any time they are logged in. The location (e.g., city) of the travel review may be restricted so that it cannot be changed.

After a user 30 saves their travel review 580, or updates their existing review 580, the social review system 10 may calculate the following values for the city: total number of travel reviews 580; percentage of users 30 who recommend traveling to the city; and average rating. After a user 30 saves a travel review 580 detail for a Place or Activity, or updates an existing review 580 detail for a Place or Activity, the social review system 10 may calculate the following values for the category to which the Place or Activity belongs (e.g. museums, shopping districts, ski resorts, etc.): total number of reviews; percentage of users 30 who recommend the Place or Activity; and average rating.

The social review system 10 may permit users to create wishlists 405 of Places 590. Users 30 may indicate destinations they wish to visit by adding cities and Places 590 to their wishlist 405. This functionality may be substantially the same as Restaurant Wishlist 405 functionality.

Users 30 may search for travel destinations by a variety of methods, for example: keying in a city name, keying in a state name, keying in the name of a category of a Place (e.g. hotels, zoos, state parks, etc.), or keying in the name of a Place 590 (e.g. Times Square, Disneyland, San Diego Zoo, etc.). This functionality may be similar to Restaurant Search and Movie Search functionality. The social review system 10 may return search results of all related entities that contain the criteria entered by the user 30. At that time, the user 30 may select one of the search results 470 to view the details, or perform a new search.

As shown in FIG. 11, if the user 30 performs a travel search for a city, the user 30 may be taken to a city screen 750 that may display summations of ratings and reviews 755 for a variety of city-centric categories (e.g. hotels, restaurants, museums, parks, shopping districts/malls, etc.), as well as links to travel reviews 580 for that city by users. The city screen 750 may serve as a dashboard of what's popular and rated highly in the city by the users 30 with links to those Places 590, as well as travel reviews 580 to that city.

Figure 12:
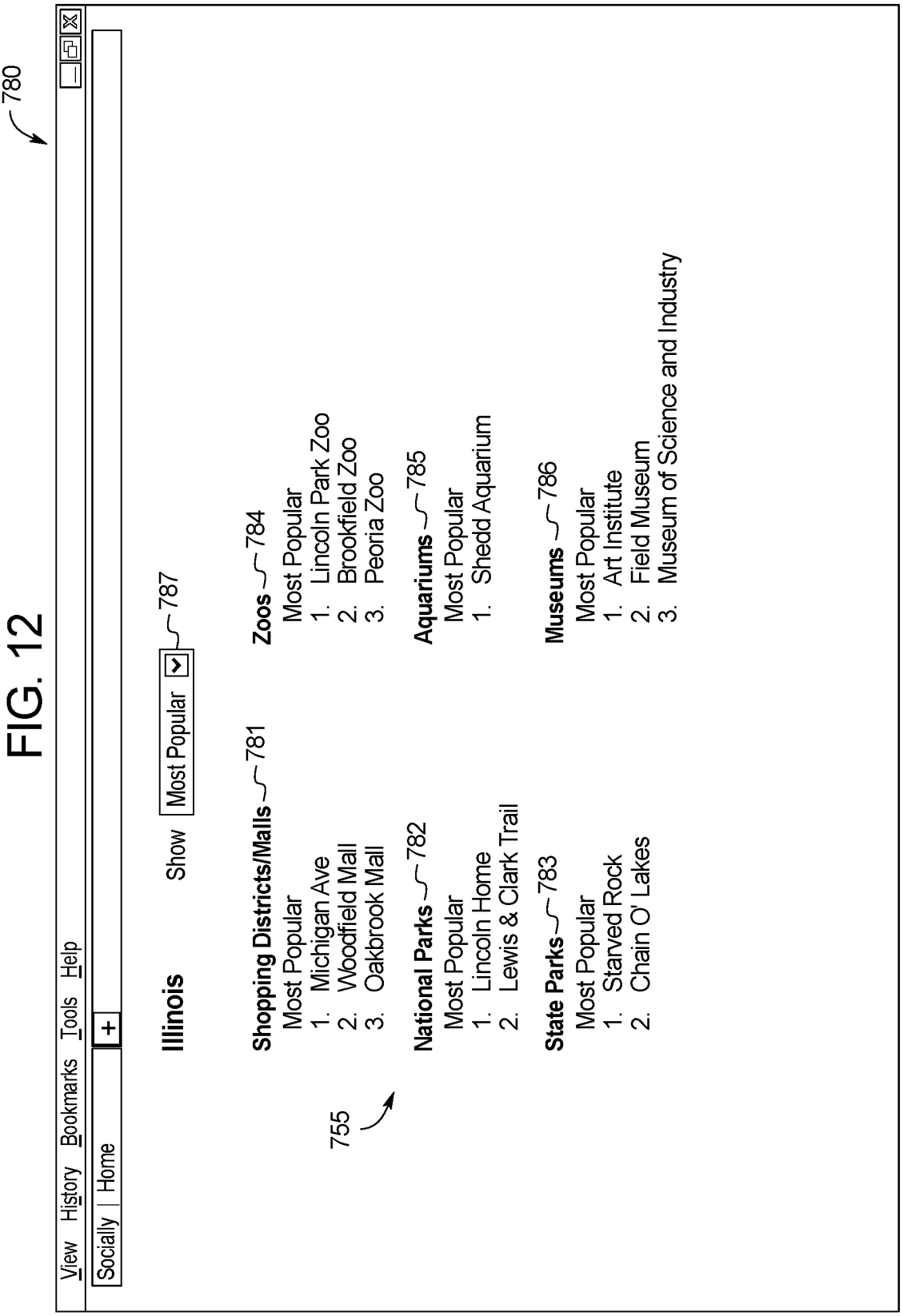
FIG. 12 is an example state screen of the social review system illustrating summary rating and review statistics for a state.

As shown in FIG. 12, if the user 30 searches for a state, the user 30 may be taken to a state screen 780 that may display summations of ratings and reviews 755 for a variety of state-centric categories (e.g. state parks, national parks, amusement parks, skiing, beaches, golf, etc.), and may include counts for the number of travel reviews 580 that have been written for cities in the state (e.g. Los Angeles, 502 reviews; San Francisco, 721 reviews; San Diego, 296 reviews; etc.). The state screen 780 may serve as a dashboard of what's popular and rated highly in the state by the users 30 with links to those Places 590, and to the cities which then have links to the travel reviews 580 as mentioned in the previous paragraph.

If the user 30 searches for a category of Places 590 (e.g. museums, ski resorts, city parks, etc.), the search results 470 may display Places 590 in that category that are in or around the location the user indicated. If the user 30 searches for a specific Place 590 (e.g. Disneyland, Space Needle, Monterrey Aquarium, etc.), the search results 470 may display Places 590 with that name that are in or around the location the user 30 indicated.

Users 30 may be able to leverage additional criteria to search for Places 590 and Travel Reviews using Advanced Travel Search functionality. This functionality may be similar to Advanced Restaurant Search functionality and Advanced Movie Search functionality. To begin, the user 30 may invoke "Advanced Travel Search" functionality. The user 30 may then be taken to the Advanced Travel Search screen. On this screen, the user 30 may be able to search for Travel Reviews and Places using the Advanced Travel Search criteria, including: location 520 (A geographical area the search should be restricted to. Options may include "City only", "Within a certain distance" of the specified location, "State", or "Country"; multiple cities may be selected; multiple states may be selected. For example, searches may include, e.g., Chicago only; within 25 miles of Washington D.C.; Florida; California and Arizona; entire US; etc.); type of place (e.g., cities, hotels, national parks, state parks, city parks, shopping districts/malls, amusement parks, ski resorts, beaches, etc.); trip type 584 (e.g., pleasure, business, pleasure and business—multiple may be selected); traveling companions 586 (e.g., traveling alone, with significant other, with extended family, with young children, with teens, etc.—multiple may be selected); minimum recommendation percentage 522 (limit search to Places 590 where the percentage of reviewers who recommend the place is above a certain threshold, e.g., at least 70% of the reviewers recommend the Place); minimum rating (Places 590 where the average rating is above a certain value); reviewed by friends 534 (limits search to only Places 590 reviewed by the user's friends); recommended by friends 536 (limits search to Places 590 reviewed and recommended by the user's friends); friends' wishlists 538 (limits search to only Places 590 that are on the user's friends' wishlists 405); Reviewed by Who I'm Following 540 (limits search to Places 590 reviewed by people the user is following); Recommended by Who I'm Following 542 (limits search to Places 590 reviewed and recommended by people the user is following); Reviewed by Me 544 (limits to Places 590 reviewed by the user or may be used to exclude Places 590 reviewed by the user); My Wishlist 546 (limits search to only Places 590 on the user's wishlist 405); and aggregate travel reviews 580 (this functionality aggregates the contents of travel reviews 580 to create one list, and shows the number of times each Place appeared in the reviews 580, along with the ratings. For instance, aggregate travel reviews 580 for New York City may return what Places 590 people went to most, e.g., Statue of Liberty—105; Central Park—99; Met Museum of Art—80; Museum of Nat Hist—50; Top of the Rock—25; etc., along with the median ratings for each Place. This type of search may not allow the user 30 to see each individual travel review 580, but may show the user 30 what the most popular Places 590 were, and their ratings, for a given location). All of the fields may be optional, and any number of criteria may be selected and combined with other criteria.

Performing the Advanced Travel Search may return a result set of Places 590 that meet the criteria specified. At that time, the user 30 may select one of the Places 590 in the search results to view the details, or perform a new search. Examples of this type of search may include: museums in New York City that have a 70% recommendation or higher; travel reviews 580 in Florida where the rating of the trip is above 6; ski resorts in Colorado and Utah that have a rating of 6 or higher; shopping districts/malls within 50 miles of Chicago that have a 60% recommendation or higher; golf courses within 25 miles of Phoenix that have a rating of 7 or higher; travel reviews 580 in California for people traveling alone; travel reviews 580 in Hawaii for people traveling with young children. Any of these searches may incorporate reviews 580 by friends only, reviewed and recommended by friends, Places 590 friends wish to visit, etc.

After performing an Advanced Travel Search, the user 30 may be permitted to save the criteria of that search. This functionality may be essentially the same as Saved Restaurant Searches functionality. To save an Advanced Travel Search, the user 30 may provide a name for the search, and activate the "Save" button 564.

The social review system 10 may manage a master list of cities. Data about cities may be stored on a database in the social review system. Some of the attributes of a city to be stored include: city name; state; latitude & longitude; and population. Every city in the social review system 10 may have its own city screen 750. The city screen 750 may display information about the city, especially summations of rating and review data 755 for city-centric Places 590, such as restaurants, hotels, etc. A button may be displayed "Add to Wishlist" that users 30 may activate to add the city to the user's travel wishlist 405. This functionality may be similar to Restaurant Wishlist functionality.

For each city, any of the following summations of Restaurant rating and review data 755 may be displayed: most popular 760 (restaurants with the highest number of reviews 360); highest recommended 761 (restaurants with the highest percentage of "recommends"); top food 762 (restaurants with the highest food rating); top ambiance 763 (restaurants with the highest ambiance rating); top service 764 (restaurants with the highest service rating); top by cuisine 765 (e.g. Top Pizza, Top Sushi, Top Steakhouse, etc.) Additionally, what restaurants are "trending" may be displayed. Restaurants that are Trending 766 may be calculated by identifying which restaurants have had the most "activity" within a certain timeframe, where "activity" may be actions users 30 perform on restaurants: writing reviews 360, adding to wishlists 405, searching, etc.

Likewise, for each city, any of the following summations of Hotel rating and review data may be displayed: most popular 760; highest recommended 761; top quality 767; and top service. Additionally, what hotels are "trending" may be displayed. Hotels that are Trending 766 may be determined by identifying which hotels have had the most "activity" within a certain timeframe, where "activity" may be actions users 30 perform on hotels: writing reviews 360, adding to wishlists 405, searching, etc.

Further, summations of rating and review data may be applied to other city-centric Places 590, such as: city parks; shopping districts and malls; other tourist attractions (e.g. Times Square, Faneuil Hall, Navy Pier, etc.); museums; Etc.

The social review system 10 may manage a master list of states in the United States, or state equivalents in other countries. Data about states may be stored on a database in the social review system 10. Some of the attributes of a state the stored on the State table may include: state name; and state abbreviation (e.g. CA, IL, WA).

As shown in FIG. 12, every state in the social review system 10 may have its own state screen 780. The state screen 780 may display information about the state, especially summations of rating and review data for state-centric Places 590 such as shopping districts and malls 781, state parks 783, national parks 782, zoos 784, aquariums 785, museums 786, etc. The summations of rating and review data may include: most popular 760; highest recommended 761; highest rated, etc. The state screen 780 may include a rating and review data selector 787 to toggle between types of summations of rating and review data such as most popular 760; highest recommended 761; highest rated, etc. Additionally, what travel destinations are "trending" may be displayed.

The social review system 10 may include calendar functionality. Calendar processing may provide calendar functionality by capturing Events, and allow users 30 to find and discover Events using search functionality. When users invoke "Calendar" functionality they may be taken to the Calendar screen. On this screen, the user 30 may see a calendar for the current month. The names and locations of Events appear on the days the Events occur.

Calendar processing may be very similar to processing for other data categories like Restaurants and Music. Users 30 may able to rate and review Events, create Event Lists, create Event Wishlists 405, and perform Event Search and Advanced Event Search.

The social review system 10 may manage a master list of Events for which users 30 may search and review. Events may be activities which people attend, such as but not limited to, film festivals, music festivals, live theater festivals; food festivals and restaurant weeks; beer and wine festivals; holiday festivals; and seasonal festivals. Functionality may be provided to allow users 30 to upload their own Events to the Calendar for which users 30 may search and review.

Data about Events may be stored on a database in the social review system 10. Some of the attributes of an Event to be stored on the Event table may include: event name; event type; address; city; state; zip; latitude & longitude; and URL.

An Event Screen may be provided to display aggregate information about the event which may be very similar to the Restaurant Screen. The Event screen may display information about the Event, and may include: name; type; address; city; state; zip code; URL; start date; end date, etc. If any of the User's friends created and uploaded the Event, that friend's name will appear next to the text, "Event Uploaded by". Rating, review, wishlist 405, and list information already described in other categories may be displayed as well.

To find events, users 30 may be enabled to search for Events and filter Events using Advanced Calendar Search Criteria, including: location 520 (a geographical area the search should be restricted to. Options may include "City only", "Within a certain distance" of the specified location, "State", or "Country". Multiple cities may be selected and multiple states may be selected, e.g., Chicago only; within 25 miles of Washington D.C.; Florida; California and Arizona; entire US; etc.); type of event (type of event for which to search: food festivals/restaurant week, live theater festivals, music festivals, film festivals, etc.; multiple categories may be selected); start date (limits search to events occurring on or after the date provided); end date (limits search to events occurring on or before this date); uploaded by friends (limited to events that were uploaded by the user's friends); uploaded by users 30 (events that were uploaded by the users 30 and may include friends; as opposed to being uploaded by the social review system 10); minimum recommendation percentage 522 (limits search to those events where the percentage of reviewers who recommend the event is above a certain threshold, e.g., at least 70% of the reviewers recommend the event); minimum rating (limits search to events where the average rating is above a certain value); reviewed by friends 534 (limits search to only events reviewed by the user's friends); recommended by friends 536 (limits searches to events reviewed and recommended by the user's friends); friends' wishlists 538 (limits searches to events that are on the user's friends' wishlists 405); Reviewed by Who I'm Following 540 (limits searches to events reviewed by people the user 30 is following); Recommended by Who I'm Following 542 (limits search to events reviewed and recommended by people the user 30 is following); Reviewed by Me 544 (limits search to events reviewed by the user 30, also may provide option to exclude events reviewed by the user 30); and My Wishlist 546 (limits searches to events on the user's wishlist 405).

Applying Advanced Calendar Search Criteria may return the names, locations and dates of Events that meet the criteria specified. At that time, the user 30 may select one of the Events in the result set to view the details, or perform a new search. Examples of this type of filtering process may include: events happening in Chicago this weekend; events happening in Oregon in August; wine festivals happening in California, Oregon and Washington between May and September; Film festivals in the United States occurring in the next three months; Live theater events happening in Los Angeles uploaded by friends; and seasonal festivals happening in Vermont uploaded by users 30.

The social review system 10 may include "What's on My Route" processing to allow a user 30 to discover Places 590 along a route they are traveling that meet certain criteria. Users 30 may invoke the "What's on My Route" functionality, and may be taken to the What's on My Route Search screen.

On this screen, the user 30 may be able to search for Places 590 using the What's on My Route Search criteria which may include: start location 720 (a geographical location such as a city in the United States); end location 730 (another geographical location such as a city in the United States); type of place for which to search 740 (type of place for which to search, e.g., cities, hotels, national parks, state parks, city parks, shopping districts/malls, amusement parks, ski resorts, beaches, etc.); minimum recommendation percentage 522 (limits search to Places 590 where the percentage of reviewers who recommend the place is above a certain threshold, e.g., at least 70% of the reviewers recommend the Place); minimum rating (limits search to Places 590 where the average rating is above a certain value); reviewed by friends 534 (limits search to Places 590 reviewed by the user's friends); recommended by friends 536 (limits search to only Places 590 reviewed and recommended by the user's friends); friends' wishlists 538 (limits search to only Places 590 that are on the user's friends' wishlists 405 are considered); Reviewed by Who I'm Following 540 (limits search to only Places 590 reviewed by people the users 30 is following); Recommended by Who I'm Following 542 (limits search to Places 590 reviewed and recommended by people the user 30 is following); Reviewed by Me 544 (limits search to Places 590 reviewed by the users 30 and/or may permit the user 30 to exclude Places 590 reviewed by the user 30); and My Wishlist 546 (limits search to Places 590 on the user's wishlist 405). The start location 720 and end location 730 may be required fields. All of the other fields may be optional, and any number of criteria may be selected and combined with other criteria.

Figure 13:
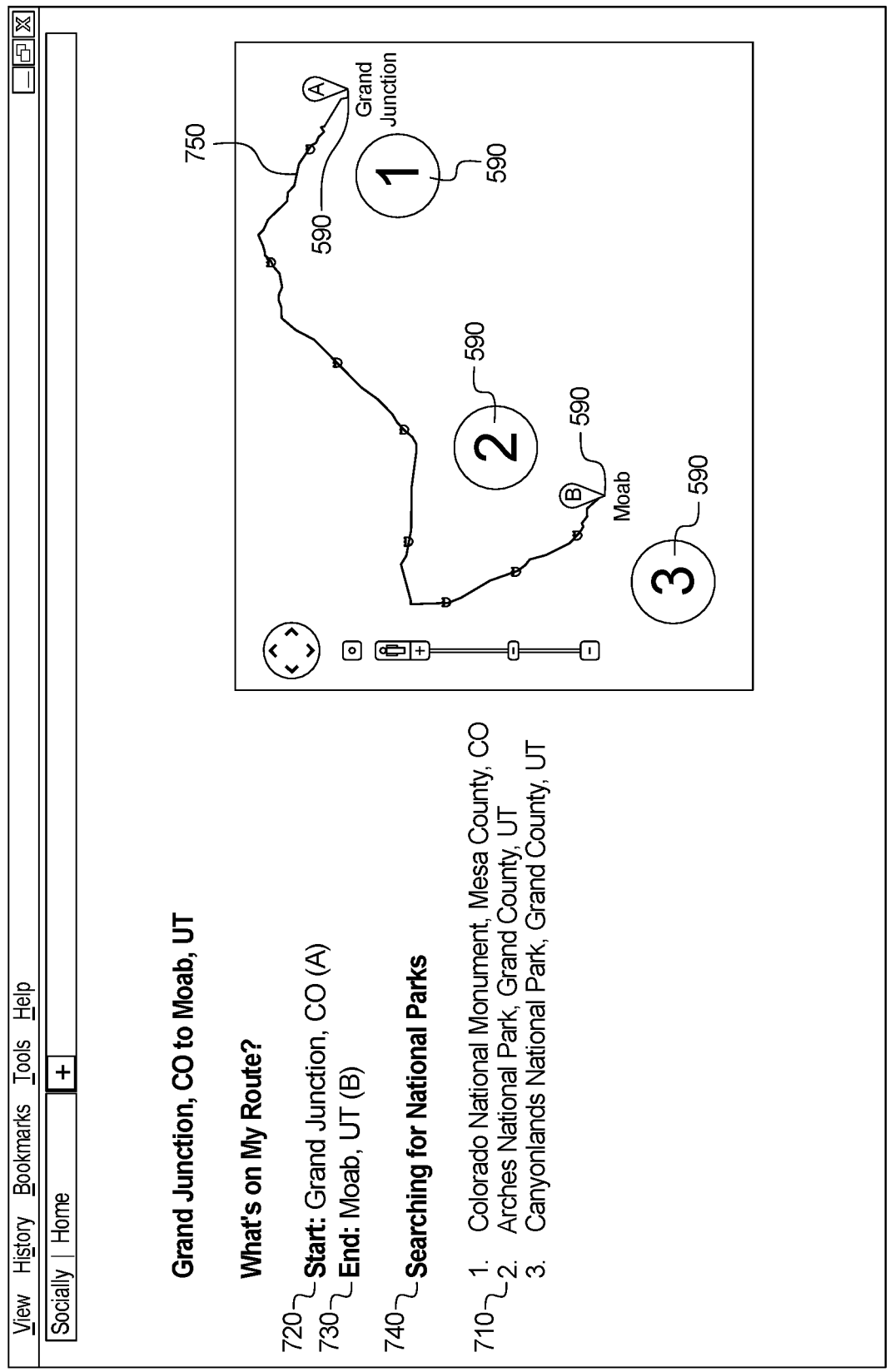
FIG. 13 is an example of a What's on My Route screen of the social review system illustrating the results along a user-defined route.

As shown in FIG. 13, performing a What's on My Route Search may return a What's on My Route search result screen 700 including results 710 listing the Places 590 that meet the criteria specified. As shown in FIG. 13, the user's search criteria included a start location 720 of Grand Junction, Co and an end location 730 of Moab, Utah, and a type of place 740 of National Parks. The user 30 may select one of the Places 590 in the results 710 to view the details, or perform a new search.

A What's on My Route Search may determine and display the most logical route 750 to get from the start location 710 to the End Location 720. The search may then select Places 590 in or near cities along the route that meet the entered criteria. Examples of this type of search may include: state and national parks between Seattle, Wash., and Portland, Oreg.; restaurants between Madison, Wis., and Minneapolis, Minn. that have a food rating of fourteen or higher; hotels between Indianapolis, Ind. and Columbus, Ohio that have a sixty percent recommendation or higher; golf courses between Phoenix, Ariz., and Las Vegas, Nev. that have a rating of 6 or higher. Any of these searches may be limited to each of or a combination of travel reviews 580 by friends only, reviewed and recommended by friends, travel reviews 580 by people I'm following only, reviewed and recommended by people I'm following, etc.

The social review network 10 may include "Who Is Nearby" processing that allows a user 30 to see which of their friends are near a given geographic area. This functionality may be limited to a user's friends. This functionality may be restricted to prevent a user 30 from seeing what other non-friend users 30 are nearby. To begin a "Who Is Nearby" search, the user 30 enters a location and invoke the "Who is Nearby" functionality. The user 30 is taken to the Who Is Nearby screen.

If a user 30 specifies a location 520 in the Location field 110, the social review system 10 may search for friends of the user 30 near the location 520. If a user 30 does not specify a location 520 in the Location field 110, the social review system 10 may search for friends of the user 30 using the location 520 from the user's Current Location field 120, which may be determined by GPS, cellular triangulation, etc. The Who Is Nearby screen displays which of the user's friends may be near the location 520.

The social review system 10 may further include an auction component for selling advertising. The social review system 10 may allow advertisers to run advertising campaigns, and to compete with other advertisers to bid on showing their advertisements to users 30 of the social review system 10 based on, for example, the users' profile: age, gender, home zip code, current location, review history. The social review system 10 may allow advertisers to create a "campaign" that defines a start date, end date, total budget, and bid price per user. For example, a campaign may include the following parameters: Start: March 1st; End: March 31st; Budget: $930; and Bid: $0.10. This would be a campaign that runs for a month (the month of March), which has a total budget of $930, and bid price of $0.10.

The social review system 10 may further allow the advertisers to select their target user 30 based on the user's profile data, including, for example: age, gender, home zip code, current location, and review history. An example of a target profile details may include: Age: 25-40; Gender: Female; Home Zip Code: 60614, 60657, 60613, 60610, 60622, 60611; Current Location: Anywhere in Chicago; and Review History: any.

Advertisers who bid on a user profile that overlapped the one above and bid greater than $0.10 may have their advertisements appear before, and more frequently, than the advertiser of this campaign. Advertisers who bid on a user profile that overlapped the one above and bid less than $0.10 may have their advertisements appear after, and less frequently, than the advertiser of this campaign. Tools may be provided to allow advertisers to manage their campaign.

Aspects of the systems and methods described herein are controlled by one or more controllers. The one or more controllers may be adapted run a variety of application programs, access and store data, including accessing and storing data in associated databases, and enable one or more interactions via user devices. Typically, the one or more controllers are implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memories and an interconnect bus. The CPU may contain a single microprocessor, or it may contain a plurality of microprocessors for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output displays (e.g., monitors, printers, touchscreen, motion-sensing input device, etc.) and one or more input mechanisms (e.g., keyboard, mouse, voice, touch, bioelectric devices, magnetic reader, RFID reader, barcode reader, touchscreen, motion-sensing input device, etc.) serving as one or more user interfaces for the controller. For example, the one or more controllers may include a graphics subsystem to drive the output display. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a server or a device 25, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A method for personalizing review information for a reviewable item for a user on a social network, comprising the steps of:

providing a social network in which a plurality of user profiles are related to each other through one or more direct and indirect relationships;

receiving one or more reviews for the reviewable item, each review associated with one of the user profiles, wherein each review of the reviewable item includes a rating and a recommendation for the reviewable item; and in response to a request from the user to view the review information for the reviewable item, displaying, by a user interface of the user, combined ratings and combined recommendations for the reviewable item for each of at least one direct relationship;

wherein, for each direct relationship, the combined ratings and the combined recommendations are determined by aggregating the ratings and recommendations from all reviews received associated with each of the other user profiles related by the direct relationship.

2. The method of claim 1, wherein a direct relationship is defined as a first order connection.

3. The method of claim 2, wherein the at least one first order connection includes user profiles of the social network that the user is following.

4. The method of claim 2, wherein the at least one first order connection includes users of the social network that the user has accepted as a first order connection in the social network.

5. The method of claim 1, further comprising displaying combined ratings and combined recommendations for the reviewable item for at least one indirect relationship, wherein the at least one indirect relationship includes all of the user's second order connections, wherein the user's second order connections include users of the social network accepted as a first order connection in the social network by any users of the social network that the user has accepted as a first order connection in the social network.

6. The method of claim 1, further comprising displaying combined ratings and combined recommendations for the reviewable item for at least one indirect relationship, wherein the at least one indirect relationship includes all users of the social network.

7. The method of claim 1, further comprising displaying combined ratings and combined recommendations for the reviewable item for at least one indirect relationship, wherein the at least one indirect relationship includes a subset of all users who exceed a threshold similarity to the user, wherein the threshold similarity is determined based on the ratings and recommendations of the user and the ratings and recommendations of each of the all users.

8. The method of claim 1, wherein the request from the user to view the review information for the reviewable item includes a designation of at least a selected one or more social degrees, and wherein the step of displaying, by a user interface, combined ratings and combined recommendations for the reviewable item at the selected one or more social degrees includes displaying the combined ratings and combined recommendations for all users of the social network at the selected one or more social degrees.

9. The method of claim 1, further comprising displaying combined ratings and combined recommendations for the reviewable item for at least one indirect relationship, wherein the at least one direct relationship includes the user's first order connections and the at least one indirect relationship includes second order connections.

10. The method of claim 1, further comprising displaying combined ratings and combined recommendations for the reviewable item for at least one indirect relationship, wherein the at least one indirect relationship includes the first order connections of the users of the social network that the user has accepted as a friend in the social network.

11. A system for personalizing review information for a reviewable item for a user on a social network comprising:

a server including a controller;

a memory coupled to the controller, wherein the memory is configured to store program instructions executable by the controller;

wherein, in response to executing the program instructions, the controller is configured to:

provide a social network in which a plurality of user profiles are related to each other through one or more direct and indirect relationships;

receive one or more reviews for the reviewable item, each review associated with one of the user profiles, wherein each review of the reviewable item includes a rating and a recommendation for the reviewable item; and in response to a request from the user to view the review information for the reviewable item, display, by a user interface of the user, combined ratings and combined recommendations for the reviewable item for each of at least one direct relationship;

wherein, for each direct relationship, the combined ratings and the combined recommendations are determined by aggregating the ratings and recommendations from all reviews received associated with each of the other user profiles related by the direct relationship.

12. The system of claim 11, wherein a direct relationship is defined as a first order connection.

13. The system of claim 12, wherein the at least one first order connection includes user profiles of the social network that the user is following.

14. The system of claim 12, wherein the at least one first order connection includes users of the social network that the user has accepted as a first order connection in the social network.

15. The system of claim 11, wherein the controller is configured to display combined ratings and combined recommendations for the reviewable item for at least one indirect relationship, wherein the at least one indirect relationship includes all of the user's second order connections, wherein the user's second order connections include users of the social network accepted as a first order connection in the social network by any users of the social network that the user has accepted as a first order connection in the social network.

16. The system of claim 11, wherein the controller is configured to display combined ratings and combined recommendations for the reviewable item for at least one indirect relationship, wherein the at least one indirect relationship includes all users of the social network.

17. The system of claim 11, wherein the controller is configured to display combined ratings and combined recommendations for the reviewable item for at least one indirect relationship, wherein the at least one indirect relationship includes a subset of all users who exceed a threshold similarity to the user, wherein the threshold similarity is determined based on the ratings and recommendations of the user and the ratings and recommendations of each of the all users.

18. The system of claim 11, wherein the request from the user to view the review information for the reviewable item includes a designation of at least a selected one or more social degrees, and wherein the step of displaying, by a user interface, combined ratings and combined recommendations for the reviewable item at the selected one or more social degrees includes displaying the combined ratings and combined recommendations for all users of the social network at the selected one or more social degrees.

19. The system of claim 11, wherein the controller is configured to display combined ratings and combined recommendations for the reviewable item for at least one indirect relationship, wherein the at least one direct relationship includes the user's first order connections and the at least one indirect relationship includes second order connections.

20. The system of claim 11, wherein the controller is configured to display combined ratings and combined recommendations for the reviewable item for at least one indirect relationship, wherein the at least one indirect relationship includes the first order connections of the users of the social network that the user has accepted as a friend in the social network.

* * * * *